United States Patent
Xu et al.

(10) Patent No.: US 12,256,380 B2
(45) Date of Patent: Mar. 18, 2025

(54) COMMUNICATION METHOD AND APPARATUS FOR UPLINK MULTI-CARRIER MIMO TRANSMISSIONS

(71) Applicant: HUAWEI TECHNOLOGIES CO., LTD., Guangdong (CN)

(72) Inventors: Zhou Xu, Shanghai (CN); Liwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 17/535,335

(22) Filed: Nov. 24, 2021

(65) Prior Publication Data

US 2022/0086875 A1 Mar. 17, 2022

Related U.S. Application Data

(63) Continuation of application No. PCT/CN2020/093010, filed on May 28, 2020.

(30) Foreign Application Priority Data

May 28, 2019 (CN) .......................... 201910453280.4

(51) Int. Cl.
*H04W 72/1268* (2023.01)
*H04L 5/00* (2006.01)
(Continued)

(52) U.S. Cl.
CPC ......... *H04W 72/1268* (2013.01); *H04L 5/001* (2013.01); *H04L 5/0092* (2013.01); *H04W 8/24* (2013.01); *H04W 72/23* (2023.01)

(58) Field of Classification Search
CPC .... H04W 72/1268; H04W 8/24; H04W 72/23
See application file for complete search history.

(56) References Cited

U.S. PATENT DOCUMENTS 8,774,103 B2 7/2014 Mudulodu et al.
9,819,433 B2 11/2017 Yi et al.
(Continued)

FOREIGN PATENT DOCUMENTS

CA  2755233 A1  9/2010
CN  101668319 A  3/2010
(Continued)

OTHER PUBLICATIONS

3GPP TS 38.101-1 V15.5.0 (Mar. 2019), "3rd Generation Partnership Project; Technical Specification Group Radio Access Network; NR; User Equipment (UE) radio transmission and reception; Part 1: Range 1 Standalone(Release 15)," Mar. 2019, 239 pages.

(Continued)

*Primary Examiner* — Jackie Zuniga Abad
(74) *Attorney, Agent, or Firm* — Fish & Richardson P.C.

(57) ABSTRACT

The present disclosure relates to communication methods and apparatus. In one example method, a terminal sends, to a network device, a quantity of radio frequency channels supported on each of a plurality of carriers when the terminal performs uplink transmission on the plurality of carriers in time division multiplexing (TDM) mode. The terminal reports, to the network device, a quantity of radio frequency channels used on each carrier when the terminal performs uplink transmission in TDM mode, so that the network device can configure, for the terminal based on an actual capability of the terminal, the quantity of radio frequency channels used on each carrier in TDM mode.

20 Claims, 12 Drawing Sheets

(51) Int. Cl.
*H04W 8/24* (2009.01)
*H04W 72/23* (2023.01)

(56) References Cited

U.S. PATENT DOCUMENTS

| | | | |
|---|---|---|---|
| 10,004,078 B2 | 6/2018 | Palm et al. | |
| 2012/0213154 A1 | 8/2012 | Gaal et al. | |
| 2014/0307820 A1 | 10/2014 | Chen et al. | |
| 2015/0098441 A1* | 4/2015 | Peng .................. | H04W 48/12 370/330 |
| 2016/0192350 A1* | 6/2016 | Yi .................. | H04L 5/0035 370/329 |
| 2018/0242319 A1 | 8/2018 | Akkarakaran et al. | |

FOREIGN PATENT DOCUMENTS

| | | |
|---|---|---|
| CN | 101868028 A | 10/2010 |
| CN | 102916791 A | 2/2013 |
| CN | 102917460 A | 2/2013 |
| CN | 109151931 A | 1/2019 |
| CN | 109587679 A | 4/2019 |
| CN | 109600796 A | 4/2019 |
| WO | 2015020440 A1 | 2/2015 |

OTHER PUBLICATIONS

3GPP TS 36.331 V15.5.1 (Apr. 2019), "3rd Generation Partnership Project; Technical Specification Group Radio Access Network; Evolved Universal Terrestrial Radio Access (E-UTRA); Radio Resource Control (RRC); Protocol specification (Release 15)," Apr. 2019, 948 pages.
PCT International Search Report and Written Opinion issued in International Application No. PCT/CN2020/093010 on Aug. 19, 2020, 18 pages (with English translation).
Extended European Search Report issued in European Application No. 20812776.1 on Jun. 8, 2022, 7 pages.
Office Action issued in Chinese Application No. 201910453280.4 on Jun. 6, 2022, 10 pages (with English translation).
Office Action issued in Indian Application No. 202137060998 on Jun. 27, 2022, 6 pages.
EP Communication Pursuant to Article 94(3) EPC in European Appln. No. 20812776.1, mailed on Sep. 23, 2024, 6 pages.

* cited by examiner

| 3.5G | Slot number | 0 | 1 | 2 | 3 | 4 | 5 | 6 | 7 | 8 | 9 |
|---|---|---|---|---|---|---|---|---|---|---|---|
| | Slot | D | D | D | S | U | D | D | D | S | U |
| 2.6G | Slot number | 0 | | 1 | | 2 | | 3 | | 4 | |
| | Slot | D | | S | | U | | U | | D | |

| 3.5G | Slot number | 0 | 1 | 2 | 3 | 4 | 5 | 6 | 7 | 8 | 9 |
|---|---|---|---|---|---|---|---|---|---|---|---|
| | Slot | D | D | D | S | U | D | D | D | S | U |
| 2.6G | Slot number | 0 | | 1 | | 2 | | 3 | | 4 | |
| | Slot | D | | S | | U | | U | | U | |

FIG. 4B

| 3.5G | Slot number | 0 | 1 | 2 | 3 | 4 | 5 | 6 | 7 | 8 | 9 |
|---|---|---|---|---|---|---|---|---|---|---|---|
| | Slot | D | D | D | S | U | D | D | D | S | U |
| 2.6G | Slot number | 0 | | 1 | | 2 | | 3 | | 4 | |
| | Slot | D | | D | | S | | U | | D | |
| 1.8G | Slot number | 0 | | 1 | | 2 | | 3 | | 4 | |
| | Slot | U | | U | | U | | U | | U | |

FIG. 4C

| Carrier 1 | Slot number | 0 | 1 | 2 | 3 | 4 | 5 | 6 | 7 | 8 | 9 |
|---|---|---|---|---|---|---|---|---|---|---|---|
| | NR TDD slot | D | D | D | S | U | D | D | D | S | U |

| Carrier 2 | Slot number | 0 | | 1 | | 2 | | 3 | | 4 | |
|---|---|---|---|---|---|---|---|---|---|---|---|
| | NR FDD UL slot | U | | U | | U | | U | | U | |
| | NR FDD DL slot | D | | D | | D | | D | | D | |

| Carrier 1 | Slot number | 0 | 1 | 2 | 3 | 4 | 5 | 6 | 7 | 8 | 9 |
|---|---|---|---|---|---|---|---|---|---|---|---|
| | Slot | D | D | D | D | D | D | D | S | U | U |

| Carrier 2 | Slot number | 0 | | 1 | | 2 | | 3 | | 4 | |
|---|---|---|---|---|---|---|---|---|---|---|---|
| | Slot | D | | S | | U | | D | | D | |

| Slot number | | 3 | 4 | 5 | 6 | 7 | 8 | 9 | 0 | 1 | 2 |
|---|---|---|---|---|---|---|---|---|---|---|---|
| Slot of a carrier 1 | | S | U | D | D | D | S | U | D | D | D |
| Slot of a carrier 2 | | U | | U | | U | | U | | U | |
| Slot of a carrier 3 | U | | U | | U | | U | | U | | |
| Slot of a carrier 4 | D | | D | | D | | D | | D | | |
| Slot number | 0 | | 1 | | 2 | | 3 | | 4 | | |
FIG. 11
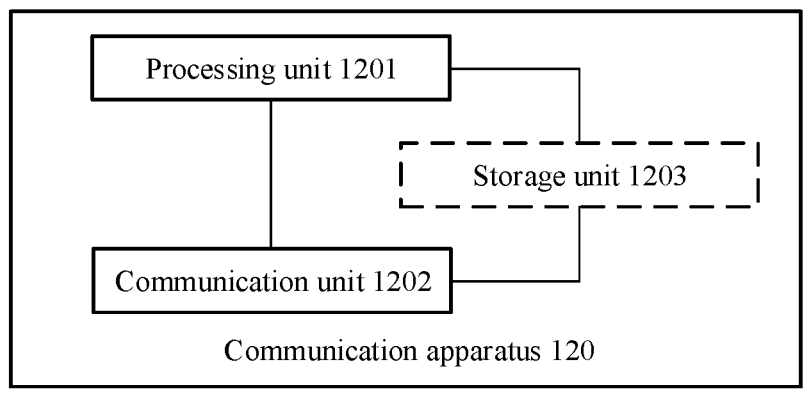
FIG. 12
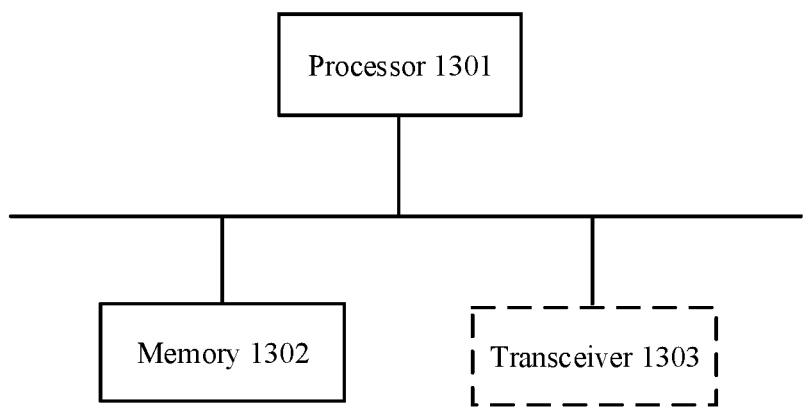
FIG. 13

COMMUNICATION METHOD AND APPARATUS FOR UPLINK MULTI-CARRIER MIMO TRANSMISSIONS

CROSS-REFERENCE TO RELATED APPLICATIONS

This application is a continuation of International Application No. PCT/CN2020/093010, filed on May 28, 2020, which claims priority to Chinese Patent Application No. 201910453280.4, filed on May 28, 2019. The disclosures of the aforementioned applications are hereby incorporated by reference in their entireties.

TECHNICAL FIELD

This application relates to the field of communication technologies, and in particular, to a communication method and apparatus.

BACKGROUND

With development of wireless communication technologies, a mobile communication network gradually evolves to a fifth generation (fifth generation, 5G) network, that is, a new radio (new radio, NR) network, and a terminal imposes higher requirements on both downlink transmission performance and uplink transmission performance.

In an actual network, because there is a relatively large amount of downlink data, a relatively large quantity of downlink time domain resources are usually allocated to the terminal, and a relatively small quantity of uplink time domain resources are allocated to the terminal. Limited uplink time domain resources cause relatively poor uplink transmission performance. Therefore, how to improve uplink transmission performance of a terminal is an urgent problem to be resolved.

SUMMARY

Embodiments of this application provide a communication method and apparatus, to improve uplink transmission performance of a terminal.

To achieve the foregoing objective, the embodiments of this application provide the following technical solutions.

According to a first aspect, a communication method is provided, and may be applied to a terminal or a chip in the terminal. An example in which the method is applied to the terminal is used for description below.

The method provided in the first aspect includes: The terminal sends first capability information to a network device, where the first capability information is used to indicate a quantity of radio frequency channels supported on each of N carriers when the terminal performs uplink transmission on the N carriers in time division multiplexing mode, and N is an integer greater than 1.

Optionally, the terminal sends second capability information to the network device, where the second capability information is used to indicate a quantity of radio frequency channels supported on each of the N carriers when the terminal performs uplink transmission on the N carriers in simultaneous transmission mode.

Optionally, a quantity of radio frequency channels supported on a first carrier when the terminal performs uplink transmission on the N carriers in time division multiplexing mode is greater than a quantity of radio frequency channels supported on the first carrier when the terminal performs uplink transmission on the N carriers in simultaneous transmission mode, where the first carrier is one of the N carriers.

Optionally, in various methods in this embodiment of this application, the quantity of radio frequency channels supported on the first carrier when the terminal performs uplink transmission on the N carriers in time division multiplexing mode may be understood as a quantity of radio frequency channels supported on the first carrier when the terminal has a capability of performing uplink transmission on the N carriers in time division multiplexing mode. The method does not require the terminal to definitely perform uplink transmission on the N carriers in time division multiplexing mode.

Optionally, in various methods in this embodiment of this application, the quantity of radio frequency channels supported on the first carrier when the terminal performs uplink transmission on the N carriers in simultaneous transmission mode may be understood as a quantity of radio frequency channels supported on the first carrier when the terminal has a capability of performing uplink transmission on the N carriers in simultaneous transmission mode. The method does not require the terminal to definitely perform uplink transmission on the N carriers in simultaneous transmission mode.

Optionally, that the terminal performs uplink transmission on the N carriers in simultaneous transmission mode may be understood as that simultaneous transmission is performed on the N carriers at least one moment.

According to the method provided in the first aspect, the terminal may report, to the network device, a quantity of radio frequency channels used on each carrier when the terminal performs uplink transmission in TDM mode, so that the network device can configure, for the terminal based on an actual capability of the terminal, the quantity of radio frequency channels used on each carrier in TDM mode. This improves an uplink transmission capability of the terminal, and improves uplink transmission performance of the terminal.

In a possible implementation, the method further includes: The terminal receives first indication information from the network device, where the first indication information is used to indicate the terminal to perform uplink transmission on the N carriers in time division multiplexing mode.

In a possible implementation, the method further includes: The terminal receives second indication information from the network device, where the second indication information is used to indicate a quantity of radio frequency channels used on each of the N carriers when the terminal performs uplink transmission on the N carriers in time division multiplexing mode, where the quantity of radio frequency channels used on each of the N carriers is the quantity of radio frequency channels supported on the carrier when the terminal performs uplink transmission on the N carriers in time division multiplexing mode. In this possible implementation, the terminal can determine the quantity of radio frequency channels used on each of the N carriers when uplink transmission is performed on the N carriers in time division multiplexing mode.

In a possible implementation, the method further includes: The terminal performs uplink transmission on the N carriers in time division multiplexing mode.

In a possible implementation, the first capability information is carried in an RRC response, UCI, MAC CE signaling, or a private message.

In a possible implementation, the method further includes: The terminal sends inter-carrier switching period information to the network device, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers. In this possible implementation, the terminal may report the inter-carrier switching period information to the network device, so that the network device can reserve, for the terminal based on the inter-carrier switching period information during scheduling, a period for performing inter-carrier switching, to ensure that the quantity of radio frequency channels used on each carrier does not decrease when the terminal performs uplink transmission in TDM mode.

In a possible implementation, the method further includes: The terminal receives third indication information from the network device, where the third indication information is used to indicate the terminal to report the inter-carrier switching period information.

In a possible implementation, the method further includes: The terminal receives fourth indication information from the network device, where the fourth indication information is used to indicate the terminal to report the first capability information.

In a possible implementation, the N carriers are carriers between the terminal and the network device. For example, the N carriers include the first carrier and a second carrier. The first carrier and the second carrier are carriers in a CA scenario, the first carrier is a primary component carrier, and the second carrier is a secondary component carrier.

In a possible implementation, the N carriers further include a carrier between the terminal and a network device different from the network device. For example, the N carriers include the first carrier and the second carrier. The first carrier and the second carrier are carriers in a DC scenario, the first carrier may be a carrier of a master base station, and the second carrier may be a carrier of a secondary base station.

According to a second aspect, a communication method is provided, and may be applied to a network device or a chip in the network device. An example in which the method is applied to the network device is used for description below.

The method provided in the second aspect includes: The network device receives first capability information from a terminal, and determines a quantity of radio frequency channels supported on each of N carriers when the terminal performs uplink transmission on the N carriers in time division multiplexing mode. The first capability information is used to indicate the quantity of radio frequency channels supported on each of the N carriers when the terminal performs uplink transmission on the N carriers in time division multiplexing mode, and N is an integer greater than 1. According to the method provided in the second aspect, the terminal may report, to the network device, a quantity of radio frequency channels used on each carrier when the terminal performs uplink transmission in TDM mode, so that the network device can configure, for the terminal based on an actual capability of the terminal, the quantity of radio frequency channels used on each carrier in TDM mode. This improves an uplink transmission capability of the terminal, and improves uplink transmission performance of the terminal.

Optionally, the network device receives second capability information from the terminal, where the second capability information is used to indicate a quantity of radio frequency channels supported on each of the N carriers when the terminal performs uplink transmission on the N carriers in simultaneous transmission mode.

Optionally, a quantity of radio frequency channels supported on a first carrier when the terminal performs uplink transmission on the N carriers in time division multiplexing mode is greater than a quantity of radio frequency channels supported on the first carrier when the terminal performs uplink transmission on the N carriers in simultaneous transmission mode, where the first carrier is one of the N carriers.

In a possible implementation, the method further includes: The network device sends first indication information to the terminal, where the first indication information is used to indicate the terminal to perform uplink transmission on the N carriers in time division multiplexing mode.

In a possible implementation, the method further includes: The network device sends second indication information to the terminal, where the second indication information is used to indicate a quantity of radio frequency channels used on each of the N carriers when the terminal performs uplink transmission on the N carriers in time division multiplexing mode, where the quantity of radio frequency channels used on each of the N carriers is the quantity of radio frequency channels supported on the carrier when the terminal performs uplink transmission on the N carriers in time division multiplexing mode. In this possible implementation, the terminal can determine the quantity of radio frequency channels used on each of the N carriers when uplink transmission is performed on the N carriers in time division multiplexing mode.

In a possible implementation, the method further includes: The network device performs uplink receiving on one or more of the N carriers.

In a possible implementation, the first capability information is carried in an RRC response, UCI, MAC CE signaling, or a private message.

In a possible implementation, the method further includes: The network device receives inter-carrier switching period information from the terminal, and schedules data on the N carriers based on the inter-carrier switching period information, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers. In this possible implementation, the terminal may report the inter-carrier switching period information to the network device, so that the network device can reserve, for the terminal based on the inter-carrier switching period information during scheduling, a period for performing inter-carrier switching, to ensure that the quantity of radio frequency channels used on each carrier does not decrease when the terminal performs uplink transmission in TDM mode.

In a possible implementation, the method further includes: The network device sends third indication information to the terminal, where the third indication information is used to indicate the terminal to report the inter-carrier switching period information.

In a possible implementation, the method further includes: The network device sends fourth indication information to the terminal, where the fourth indication information is used to indicate the terminal to report the first capability information.

In a possible implementation, the N carriers are carriers between the terminal and the network device. For example, the N carriers include the first carrier and a second carrier. The first carrier and the second carrier are carriers in a CA scenario, the first carrier is a primary component carrier, and the second carrier is a secondary component carrier.

In a possible implementation, the N carriers further include a carrier between the terminal and a network device different from the network device. For example, the N carriers include the first carrier and the second carrier. The first carrier and the second carrier are carriers in a DC scenario, the first carrier may be a carrier of a master base station, and the second carrier may be a carrier of a secondary base station.

According to a third aspect, a communication method is provided, and may be applied to a terminal or a chip in the terminal. An example in which the method is applied to the terminal is used for description below.

The method provided in the third aspect includes: The terminal obtains inter-carrier switching period information; and the terminal sends inter-carrier switching period information to the network device, where if a switching period between any two of N carriers is the same, the inter-carrier switching period information indicates the switching period between any two of the N carriers; if a switching period between any two different carriers in the N carriers is different, the inter-carrier switching period information indicates the switching period between every two different carriers in the N carriers; or the inter-carrier switching period information indicates a switching period between two carriers with a longest switching period in the N carriers.

For example, the N carriers include a first carrier and a second carrier. The inter-carrier switching period information may indicate a switching period between the first carrier and the second carrier, and the terminal may obtain the inter-carrier switching period information and send the inter-carrier switching period information to the network device.

In a possible implementation, the method further includes: The terminal receives third indication information from the network device, where the third indication information is used to indicate the terminal to report the inter-carrier switching period information.

In a possible implementation, a switching period between the first carrier and the second carrier includes a period of switching from the first carrier to the second carrier, or comprises a period of switching from the second carrier to the first carrier, or comprises a period of switching from the first carrier to the second carrier and a period of switching from the second carrier to the first carrier.

In a possible implementation, the period of switching from the first carrier to the second carrier is 0 microseconds or greater than 0 microseconds or the period of switching from the second carrier to the first carrier is 0 microseconds or greater than 0 microseconds.

In a possible implementation, the N carriers are carriers between the terminal and the network device. For example, the N carriers include the first carrier and the second carrier. The first carrier and the second carrier are carriers in a CA scenario, the first carrier is a primary component carrier, and the second carrier is a secondary component carrier.

In a possible implementation, the N carriers further include a carrier between the terminal and a network device different from the network device. For example, the N carriers include the first carrier and the second carrier. The first carrier and the second carrier are carriers in a DC scenario, the first carrier may be a carrier of a master base station, and the second carrier may be a carrier of a secondary base station.

Using the first carrier and the second carrier in the N carriers as an example, the method further includes: switching from the first carrier to the second carrier within duration of a silent time domain resource.

A preceding symbol adjacent to the silent time domain resource belongs to a transmission time domain resource (which, for example, may be a PUSCH time domain resource, an SRS time domain resource, or a PUCCH time domain resource) of the first carrier, and a subsequent symbol adjacent to the silent time domain resource belongs to a transmission time domain resource (which, for example, may be a PUSCH time domain resource, an SRS time domain resource, or a PUCCH time domain resource) of the second carrier.

Optionally, a length of the silent time domain resource is greater than or equal to the switching period between the first carrier and the second carrier.

Optionally, the switching from the first carrier to the second carrier within duration of a silent time domain resource includes:

switching one or more radio frequency channels from the first carrier to the second carrier within duration of the silent time domain resource.

Optionally, the method further includes: receiving, from the network device, indication information for indicating to report the switching period information.

For switching performed by the terminal between every two carriers in the N carriers, refer to the foregoing content of switching between the first carrier and the second carrier.

Optionally, the method in the third aspect provided in this application may be combined with the method in the first aspect.

In the example in which the N carriers include the first carrier and the second carrier, the method in the third aspect further includes: The terminal sends first capability information to the network device, where the first capability information is used to indicate a quantity of radio frequency channels supported on the first carrier and a quantity of radio frequency channels supported on the second carrier when the terminal performs uplink transmission on the first carrier and the second carrier in time division multiplexing mode.

Optionally, the terminal may further send second capability information to the network device, where the second capability information is used to indicate a quantity of radio frequency channels supported on the first carrier and a quantity of radio frequency channels supported on the second carrier when the terminal performs uplink transmission on the first carrier and the second carrier in simultaneous transmission mode.

Optionally, the quantity of radio frequency channels supported on the first carrier when the terminal performs uplink transmission on the first carrier and the second carrier in time division multiplexing mode is greater than the quantity of radio frequency channels supported on the first carrier when the terminal performs uplink transmission on the first carrier and the second carrier in simultaneous transmission mode.

Optionally, the method further includes: The terminal receives first indication information from the network device, where the first indication information is used to indicate the terminal to perform uplink transmission on the first carrier and the second carrier in time division multiplexing mode.

Optionally, the first indication information is further used to indicate a quantity of radio frequency channels used on the first carrier and a quantity of radio frequency channels used on the second carrier when the terminal performs uplink transmission on the first carrier and the second carrier in time division multiplexing mode.

The quantity of radio frequency channels used on the first carrier when the terminal performs uplink transmission on the first carrier and the second carrier in time division multiplexing mode is equal to the quantity of radio frequency channels supported on the first carrier when the terminal performs uplink transmission on the first carrier and the second carrier in time division multiplexing mode.

Optionally, the quantity of radio frequency channels used on the second carrier when the terminal performs uplink transmission on the first carrier and the second carrier in time division multiplexing mode is equal to the quantity of radio frequency channels supported on the second carrier when the terminal performs uplink transmission on the first carrier and the second carrier in time division multiplexing mode.

Optionally, performing uplink transmission on the first carrier and the second carrier in time division multiplexing mode includes:

performing, based on the first indication information, uplink transmission on the first carrier and the second carrier in time division multiplexing mode.

Optionally, in the foregoing method, the terminal performs uplink transmission on the first carrier and the second carrier in time division multiplexing mode.

The quantity of radio frequency channels supported on the first carrier when the terminal performs uplink transmission on the first carrier and the second carrier in time division multiplexing mode is greater than the quantity of radio frequency channels supported on the first carrier when the terminal performs uplink transmission on the first carrier and the second carrier in simultaneous transmission mode.

According to a fourth aspect, a communication method is provided, and may be applied to a network device or a chip in the network device. An example in which the method is applied to the network device is used for description below.

The method provided in the fourth aspect includes: The network device receives inter-carrier switching period information from a terminal; and the network device schedules data on N carriers based on the inter-carrier switching period information, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers.

For example, the N carriers include a first carrier and a second carrier. The inter-carrier switching period information may indicate a switching period between the first carrier and the second carrier, and the terminal may obtain the inter-carrier switching period information and send the inter-carrier switching time period information to the network device.

In a possible implementation, the method further includes: The network device sends third indication information to the terminal, where the third indication information is used to indicate the terminal to report the inter-carrier switching period information.

In a possible implementation, the N carriers are carriers between the terminal and the network device. For example, the N carriers include the first carrier and the second carrier. The first carrier and the second carrier are carriers in a CA scenario, the first carrier is a primary component carrier, and the second carrier is a secondary component carrier.

In a possible implementation, the N carriers further include a carrier between the terminal and a network device different from the network device. For example, the N carriers include the first carrier and the second carrier. The first carrier and the second carrier are carriers in a DC scenario, the first carrier may be a carrier of a master base station, and the second carrier may be a carrier of a secondary base station.

In a possible implementation, using the first carrier and the second carrier in the N carriers as an example, the switching period between the first carrier and the second carrier includes a period of switching from the first carrier to the second carrier.

The method further includes: determining a silent time domain resource, and keeping silent within duration of the silent time domain resource.

A preceding symbol adjacent to the silent time domain resource belongs to a transmission time domain resource (which, for example, may be a PUSCH time domain resource, an SRS time domain resource, or a PUCCH time domain resource) of the first carrier, and a subsequent symbol adjacent to the silent time domain resource belongs to a transmission time domain resource (which, for example, may be a PUSCH time domain resource, an SRS time domain resource, or a PUCCH time domain resource) of the second carrier.

Optionally, a length of the silent time domain resource is greater than or equal to the switching period between the first carrier and the second carrier.

Optionally, the period of switching from the first carrier to the second carrier is 0 microseconds or greater than 0 microseconds, or the period of switching from the second carrier to the first carrier is 0 microseconds or greater than 0 microseconds.

In a possible implementation, the method further includes: The network device receives first capability information from the terminal, where the first capability information is used to indicate a quantity of radio frequency channels supported on the first carrier and a quantity of radio frequency channels supported on the second carrier when the terminal performs uplink transmission on the first carrier and the second carrier in time division multiplexing mode; and the network device determines the quantity of radio frequency channels supported on the first carrier and the quantity of radio frequency channels supported on the second carrier when the terminal performs uplink transmission on the first carrier and the second carrier in time division multiplexing mode.

In a possible implementation, the method further includes: The network device receives second capability information from the terminal, where the second capability information is used to indicate a quantity of radio frequency channels supported on the first carrier and a quantity of radio frequency channels supported on the second carrier when the terminal performs uplink transmission on the first carrier and the second carrier in simultaneous transmission mode;

and the network device determines the quantity of radio frequency channels supported on the first carrier and the quantity of radio frequency channels supported on the second carrier when the terminal performs uplink transmission on the first carrier and the second carrier in simultaneous transmission mode.

In a possible implementation, the quantity of radio frequency channels supported on the first carrier when the terminal performs uplink transmission on the first carrier and the second carrier in time division multiplexing mode is greater than the quantity of radio frequency channels supported on the first carrier when the terminal performs uplink transmission on the first carrier and the second carrier in simultaneous transmission mode.

In a possible implementation, the method further includes: The network device sends first indication information to the terminal, where the first indication information is used to indicate the terminal to perform uplink transmission on the first carrier and the second carrier in time division multiplexing mode.

In a possible implementation, the first indication information is further used to indicate a quantity of radio frequency channels used on the first carrier and a quantity of radio frequency channels used on the second carrier when the terminal performs uplink transmission on the first carrier and the second carrier in time division multiplexing mode.

In a possible implementation, the quantity of radio frequency channels used on the first carrier when the terminal performs uplink transmission on the first carrier and the second carrier in time division multiplexing mode is equal to the quantity of radio frequency channels supported on the first carrier when the terminal performs uplink transmission on the first carrier and the second carrier in time division multiplexing mode.

In a possible implementation, the quantity of radio frequency channels used on the second carrier when the terminal performs uplink transmission on the first carrier and the second carrier in time division multiplexing mode is equal to the quantity of radio frequency channels supported on the second carrier when the terminal performs uplink transmission on the first carrier and the second carrier in time division multiplexing mode. For descriptions of determining, by the network device, the silent time domain resource between every two carriers in the N carriers, and keeping silent within duration of the silent time domain resource, refer to the foregoing content related to the first carrier and the second carrier.

The method in the fourth aspect may be further combined with the method in the second aspect. For details, refer to the method in the second aspect. Details are not described herein again.

For beneficial effects of the possible implementations of the third aspect and the fourth aspect, refer to beneficial effects of corresponding implementations of the first aspect and the second aspect. Details are not described herein again.

According to a fifth aspect, a communication method is provided, and may be applied to a terminal or a chip in the terminal. An example in which the method is applied to the terminal is used for description below.

The method provided in the fifth aspect includes: performing, by a terminal, uplink transmission on N carriers in TDM mode, where a quantity of radio frequency channels used on each of the N carriers is a quantity of radio frequency channels supported on the carrier when the terminal performs uplink transmission on the N carriers in time division multiplexing mode, a quantity of radio frequency channels supported on a first carrier when the terminal performs uplink transmission on the N carriers in time division multiplexing mode is greater than a quantity of radio frequency channels supported on the first carrier when the terminal performs uplink transmission on the N carriers in simultaneous transmission mode, and the first carrier is one of the N carriers. It may be understood that a quantity of radio frequency channels used on at least one carrier when the terminal performs uplink transmission on the N carriers in TDM mode is greater than a quantity of radio frequency channels used on the at least one carrier when the terminal performs uplink transmission on the N carriers in simultaneous transmission mode.

According to the method provided in the fifth aspect, the terminal may perform uplink transmission on the N carriers in TDM mode, and a first radio frequency channel quantity supported on at least one carrier in the N carriers is greater than a supported second radio frequency channel quantity, thereby improving an uplink transmission capability of the terminal.

For example, the N carriers are the first carrier and a second carrier. The terminal performs uplink transmission on the first carrier, and also performs uplink transmission on the second carrier. A quantity of radio frequency channels used on the first carrier when uplink transmission is performed on the first carrier and the second carrier in TDM mode is the first radio frequency channel quantity, a quantity of radio frequency channels used on the first carrier when uplink transmission is performed on the first carrier and the second carrier in simultaneous transmission mode is the second radio frequency channel quantity, and the first radio frequency channel quantity is greater than the second radio frequency channel quantity.

In a possible implementation, the method further includes: The terminal performs uplink transmission on a third carrier, where uplink transmission is performed on the third carrier and any one of the N carriers in simultaneous transmission mode within a first time range.

In a possible implementation, the method further includes: The terminal obtains first capability information, where the first capability information is used to indicate the quantity of radio frequency channels supported on each of the N carriers when the terminal performs uplink transmission on the N carriers in time division multiplexing mode, and N is an integer greater than 1; and the terminal sends the first capability information to a network device.

In a possible implementation, the method further includes: The terminal sends second capability information to the network device, where the second capability information is used to indicate a quantity of radio frequency channels supported on the first carrier and a quantity of radio frequency channels supported on the second carrier when the terminal performs uplink transmission on the first carrier and the second carrier in simultaneous transmission mode.

In a possible implementation, the method further includes: The terminal receives first indication information from the network device, where the first indication information is used to indicate the terminal to perform uplink transmission on the N carriers in time division multiplexing mode.

In a possible implementation, the first indication information is further used to indicate the quantity of radio frequency channels used on each of the N carriers when the terminal performs uplink transmission on the N carriers in time division multiplexing mode.

In a possible implementation, the method further includes: performing, based on the first indication information, uplink transmission on the first carrier and the second carrier in time division multiplexing mode.

In a possible implementation, the method further includes: The terminal performs uplink transmission on the N carriers in time division multiplexing mode.

In a possible implementation, the first capability information is carried in an RRC response, UCI, MAC CE signaling, or a private message.

In a possible implementation, the method further includes: The terminal sends inter-carrier switching period information to the network device, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers.

In a possible implementation, the method further includes: The terminal receives third indication information from the network device, where the third indication information is used to indicate the terminal to report the inter-carrier switching period information.

In a possible implementation, the method further includes: The terminal receives fourth indication information from the network device, where the fourth indication information is used to indicate the terminal to report the first capability information.

In a possible implementation, the N carriers are carriers between the terminal and the network device. For example, the N carriers include the first carrier and the second carrier. The first carrier and the second carrier are carriers in a CA scenario, the first carrier is a primary component carrier, and the second carrier is a secondary component carrier.

In a possible implementation, the N carriers further include a carrier between the terminal and a network device different from the network device. For example, the N carriers include the first carrier and the second carrier. The first carrier and the second carrier are carriers in a DC scenario, the first carrier may be a carrier of a master base station, and the second carrier may be a carrier of a secondary base station.

For example, the N carriers are the first carrier and the second carrier. In a possible implementation, the method further includes: switching from the first carrier to the second carrier within duration of a silent time domain resource.

In a possible implementation, that the terminal switches from the first carrier to the second carrier within duration of the silent time domain resource includes: The terminal switches one or more radio frequency channels from the first carrier to the second carrier within duration of the silent time domain resource.

A preceding symbol adjacent to the silent time domain resource belongs to a transmission time domain resource (which, for example, may be a PUSCH time domain resource, an SRS time domain resource, or a PUCCH time domain resource) of the first carrier, and a subsequent symbol adjacent to the silent time domain resource belongs to a transmission time domain resource (which, for example, may be a PUSCH time domain resource, an SRS time domain resource, or a PUCCH time domain resource) of the second carrier.

Optionally, a length of the silent time domain resource is greater than or equal to the switching period between the first carrier and the second carrier.

For switching performed by the terminal between every two carriers in the N carriers, refer to the foregoing content of switching between the first carrier and the second carrier.

The methods in the first aspect to the fifth aspect may be combined with each other. It should be noted that the methods in the first aspect to the fifth aspect are described from a perspective of the terminal or the network device, and the methods in the first aspect to the fifth aspect may be correspondingly performed by the chip in the terminal or the network device. Optionally, the steps performed by the terminal in the methods in the first aspect to the fifth aspect (and the specific implementations of this application) may be performed by a first communication apparatus (where for example, the first communication apparatus may be a terminal or a chip in the terminal), and the steps performed by the network device in the methods in the first aspect to the fifth aspect (and the specific implementations of this application) may be performed by a second communication apparatus (where for example, the second communication apparatus may be a network device or a chip in the network device).

According to a sixth aspect, a communication apparatus is provided, and includes a communication unit and a processing unit. The processing unit is configured to send first capability information to a network device by using the communication unit, where the first capability information is used to indicate a quantity of radio frequency channels supported on each of N carriers when the communication apparatus performs uplink transmission on the N carriers in time division multiplexing mode, and N is an integer greater than 1.

Optionally, the processing unit is further configured to send second capability information to the network device by using the communication unit, where the second capability information is used to indicate a quantity of radio frequency channels supported on each of the N carriers when the communication apparatus performs uplink transmission on the N carriers in simultaneous transmission mode.

Optionally, a quantity of radio frequency channels supported on a first carrier when the communication apparatus performs uplink transmission on the N carriers in time division multiplexing mode is greater than a quantity of radio frequency channels supported on the first carrier when the communication apparatus performs uplink transmission on the N carriers in simultaneous transmission mode, where the first carrier is one of the N carriers.

In a possible implementation, the communication unit is further configured to receive first indication information from the network device, where the first indication information is used to indicate the communication apparatus to perform uplink transmission on the N carriers in time division multiplexing mode.

In a possible implementation, the communication unit is further configured to receive second indication information from the network device, where the second indication information is used to indicate a quantity of radio frequency channels used on each of the N carriers when the communication apparatus performs uplink transmission on the N carriers in time division multiplexing mode, where the quantity of radio frequency channels used on each of the N carriers is the quantity of radio frequency channels supported on the carrier when the communication apparatus performs uplink transmission on the N carriers in time division multiplexing mode.

In a possible implementation, the communication unit is further configured to perform uplink transmission on the N carriers in time division multiplexing mode.

In a possible implementation, the first capability information is carried in an RRC response, UCI, MAC CE signaling, or a private message.

In a possible implementation, the communication unit is further configured to send inter-carrier switching period information to the network device, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers.

In a possible implementation, the communication unit is further configured to receive third indication information from the network device, where the third indication information is used to indicate the communication apparatus to report the inter-carrier switching period information.

In a possible implementation, the communication unit is further configured to receive fourth indication information from the network device, where the fourth indication information is used to indicate the communication apparatus to report the first capability information.

In a possible implementation, the N carriers are carriers between the communication apparatus and the network device.

In a possible implementation, the N carriers further include a carrier between the communication apparatus and a network device different from the network device.

According to a seventh aspect, a communication apparatus is provided, and includes a communication unit and a processing unit. The communication unit is configured to receive first capability information from a terminal, where the first capability information is used to indicate a quantity of radio frequency channels supported on each of N carriers when the terminal performs uplink transmission on the N carriers in time division multiplexing mode, and N is an integer greater than 1. The processing unit is configured to determine the quantity of radio frequency channels supported on each of the N carriers when the terminal performs uplink transmission on the N carriers in time division multiplexing mode.

Optionally, the communication unit is further configured to receive second capability information from the terminal, where the second capability information is used to indicate a quantity of radio frequency channels supported on each of the N carriers when the terminal performs uplink transmission on the N carriers in simultaneous transmission mode. The processing unit is further configured to determine the quantity of radio frequency channels supported on each of the N carriers when the terminal performs uplink transmission on the N carriers in simultaneous transmission mode.

Optionally, a quantity of radio frequency channels supported on a first carrier when the terminal performs uplink transmission on the N carriers in time division multiplexing mode is greater than a quantity of radio frequency channels supported on the first carrier when the terminal performs uplink transmission on the N carriers in simultaneous transmission mode, where the first carrier is one of the N carriers.

In a possible implementation, the communication unit is further configured to send first indication information to the terminal, where the first indication information is used to indicate the terminal to perform uplink transmission on the N carriers in time division multiplexing mode.

In a possible implementation, the communication unit is further configured to send second indication information to the terminal, where the second indication information is used to indicate a quantity of radio frequency channels used on each of the N carriers when the terminal performs uplink transmission on the N carriers in time division multiplexing mode, where the quantity of radio frequency channels used on each of the N carriers is the quantity of radio frequency channels supported on the carrier when the terminal performs uplink transmission on the N carriers in time division multiplexing mode.

In a possible implementation, the communication unit is further configured to perform uplink receiving on one or more of the N carriers.

In a possible implementation, the first capability information is carried in an RRC response, UCI, MAC CE signaling, or a private message.

In a possible implementation, the communication unit is further configured to receive inter-carrier switching period information from the terminal; and the processing unit is further configured to schedule data on the N carriers based on the inter-carrier switching period information, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers.

In a possible implementation, the communication unit is further configured to send third indication information to the terminal, where the third indication information is used to indicate the terminal to report the inter-carrier switching period information.

In a possible implementation, the communication unit is further configured to send fourth indication information to the terminal, where the fourth indication information is used to indicate the terminal to report the first capability information.

In a possible implementation, the N carriers are carriers between the terminal and the communication apparatus.

In a possible implementation, the N carriers further include a carrier between the terminal and a communication apparatus different from the communication apparatus.

According to an eighth aspect, a communication apparatus is provided. The apparatus has a function of implementing any method according to the first aspect, the second aspect, or the third aspect. The function may be implemented by hardware, or may be implemented by hardware executing corresponding software. The hardware or the software includes one or more units corresponding to the function. For example, the apparatus may include a communication unit and a processing unit. The processing unit is configured to perform a processing action in the first aspect, the second aspect, or the third aspect (for example, an action other than sending and/or receiving). The communication unit is configured to perform a sending action and/or a receiving action in the first aspect, the second aspect, or the third aspect. Optionally, the action performed by the communication unit is performed under control of the processing unit. Optionally, the communication unit includes a sending unit and a receiving unit. In this case, the sending unit is configured to perform the sending action in the first aspect, the second aspect, or the third aspect, and the receiving unit is configured to perform the receiving action in the first aspect, the second aspect, or the third aspect. The apparatus may exist in a product form of a chip.

For the third aspect, the communication apparatus includes a communication unit and a processing unit. The processing unit is configured to obtain inter-carrier switching period information, where if a switching period between any two of N carriers is the same, the inter-carrier switching period information indicates the switching period between any two of the N carriers; if a switching period between any two different carriers in the N carriers is different, the inter-carrier switching period information indicates the switching period between every two different carriers in the N carriers; or the inter-carrier switching period information indicates a switching period between two carriers with a longest switching period in the N carriers, where N is an integer greater than 1. The communication unit is configured to send the inter-carrier switching period information to a network device.

In a possible implementation, the communication unit is further configured to receive third indication information from the network device, where the third indication information is used to indicate the communication apparatus to report the inter-carrier switching period information.

In a possible implementation, the N carriers are carriers between the communication apparatus and the network device.

In a possible implementation, the N carriers further include a carrier between the communication apparatus and a network device different from the network device.

In a possible implementation, the N carriers include a first carrier and a second carrier.

In a possible implementation, a switching period between the first carrier and the second carrier includes a period of switching from the first carrier to the second carrier, or comprises a period of switching from the second carrier to the first carrier, or comprises a period of switching from the first carrier to the second carrier and a period of switching from the second carrier to the first carrier.

In a possible implementation, the period of switching from the first carrier to the second carrier is 0 microseconds or greater than 0 microseconds, or the period of switching from the second carrier to the first carrier is 0 microseconds or greater than 0 microseconds.

In a possible implementation, the communication unit is further configured to send first capability information to the network device, where the first capability information is used to indicate a quantity of radio frequency channels supported on the first carrier and a quantity of radio frequency channels supported on the second carrier when the communication apparatus performs uplink transmission on the first carrier and the second carrier in time division multiplexing mode.

In a possible implementation, the communication unit is further configured to send second capability information to the network device, where the second capability information is used to indicate a quantity of radio frequency channels supported on the first carrier and a quantity of radio frequency channels supported on a second carrier when the communication apparatus performs uplink transmission on the first carrier and the second carrier in simultaneous transmission mode.

In a possible implementation, the quantity of radio frequency channels supported on the first carrier when the communication apparatus performs uplink transmission on the first carrier and the second carrier in time division multiplexing mode is greater than the quantity of radio frequency channels supported on the first carrier when the communication apparatus performs uplink transmission on the first carrier and the second carrier in simultaneous transmission mode.

In a possible implementation, the communication unit is further configured to receive first indication information from the network device, where the first indication information is used to indicate the communication apparatus to perform uplink transmission on the first carrier and the second carrier in time division multiplexing mode; and the processing unit is further configured to perform, based on the first indication information, uplink transmission on the first carrier and the second carrier in time division multiplexing mode by using the communication unit.

In a possible implementation, the first indication information is further used to indicate a quantity of radio frequency channels used on the first carrier and a quantity of radio frequency channels used on the second carrier when the communication apparatus performs uplink transmission on the first carrier and the second carrier in time division multiplexing mode.

In a possible implementation, the quantity of radio frequency channels used on the first carrier when the communication apparatus performs uplink transmission on the first carrier and the second carrier in time division multiplexing mode is equal to the quantity of radio frequency channels supported on the first carrier when the communication apparatus performs uplink transmission on the first carrier and the second carrier in time division multiplexing mode.

In a possible implementation, the quantity of radio frequency channels used on the second carrier when the communication apparatus performs uplink transmission on the first carrier and the second carrier in time division multiplexing mode is equal to the quantity of radio frequency channels supported on the second carrier when the communication apparatus performs uplink transmission on the first carrier and the second carrier in time division multiplexing mode.

In a possible implementation, the processing unit is further configured to switch from the first carrier to the second carrier within duration of a silent time domain resource, where a preceding symbol adjacent to the silent time domain resource belongs to a transmission time domain resource of the first carrier, and a subsequent symbol adjacent to the silent time domain resource belongs to a transmission time domain resource of the second carrier.

In a possible implementation, a length of the silent time domain resource is greater than or equal to the switching period between the first carrier and the second carrier.

In a possible implementation, the processing unit is specifically configured to switch one or more radio frequency channels from the first carrier to the second carrier within duration of the silent time domain resource.

According to a ninth aspect, a communication apparatus is provided. The apparatus has a function of implementing the method provided in the fourth aspect. The function may be implemented by hardware, or may be implemented by hardware executing corresponding software. The hardware or the software includes one or more units corresponding to the function. For example, the apparatus may include a communication unit and a processing unit. The processing unit is configured to perform a processing action (for example, an action other than sending and/or receiving) in the fourth aspect, and the communication unit is configured to perform a sending action and/or a receiving action in the fourth aspect. Optionally, the action performed by the communication unit is performed under control of the processing unit. Optionally, the communication unit includes a sending unit and a receiving unit. In this case, the sending unit is configured to perform the sending action in the fourth aspect, and the receiving unit is configured to perform the receiving action in the fourth aspect. The apparatus may exist in a product form of a chip.

For example, the communication apparatus provided in the ninth aspect includes a processing unit and a communication unit. The communication unit is configured to receive inter-carrier switching period information from a terminal, where if a switching period between any two of N carriers is the same, the inter-carrier switching period information indicates the switching period between any two of the N carriers; if a switching period between any two different carriers in the N carriers is different, the inter-carrier switching period information indicates the switching period between every two different carriers in the N carriers; or the inter-carrier switching period information indicates a switching period between two carriers with a longest switching period in the N carriers, where N is an integer greater than 1. The processing unit is configured to schedule data on the N carriers based on the inter-carrier switching period information.

In a possible implementation, the communication unit is further configured to send third indication information to the terminal, where the third indication information is used to indicate the terminal to report the inter-carrier switching period information.

In a possible implementation, the N carriers are carriers between the terminal and the communication apparatus.

In a possible implementation, the N carriers further include a carrier between the terminal and a communication apparatus different from the communication apparatus.

In a possible implementation, the N carriers include a first carrier and a second carrier.

In a possible implementation, a switching period between the first carrier and the second carrier includes a period of switching from the first carrier to the second carrier, or comprises a period of switching from the second carrier to the first carrier, or comprises a period of switching from the first carrier to the second carrier and a period of switching from the second carrier to the first carrier.

In a possible implementation, the period of switching from the first carrier to the second carrier is 0 microseconds or greater than 0 microseconds, or the period of switching from the second carrier to the first carrier is 0 microseconds or greater than 0 microseconds.

In a possible implementation, the communication unit is further configured to receive first capability information from the terminal, where the first capability information is used to indicate a quantity of radio frequency channels supported on the first carrier and a quantity of radio frequency channels supported on the second carrier when the terminal performs uplink transmission on the first carrier and the second carrier in time division multiplexing mode; and the processing unit is further configured to determine the quantity of radio frequency channels supported on the first carrier and the quantity of radio frequency channels supported on the second carrier when the terminal performs uplink transmission on the first carrier and the second carrier in time division multiplexing mode.

In a possible implementation, the communication unit is further configured to receive second capability information from the terminal, where the second capability information is used to indicate a quantity of radio frequency channels supported on the first carrier and a quantity of radio frequency channels supported on the second carrier when the terminal performs uplink transmission on the first carrier and the second carrier in simultaneous transmission mode; and the processing unit is further configured to determine the quantity of radio frequency channels supported on the first carrier and the quantity of radio frequency channels supported on the second carrier when the terminal performs uplink transmission on the first carrier and the second carrier in simultaneous transmission mode.

In a possible implementation, the quantity of radio frequency channels supported on the first carrier when the terminal performs uplink transmission on the first carrier and the second carrier in time division multiplexing mode is greater than the quantity of radio frequency channels supported on the first carrier when the terminal performs uplink transmission on the first carrier and the second carrier in simultaneous transmission mode.

In a possible implementation, the communication unit is further configured to send first indication information to the terminal, where the first indication information is used to indicate the terminal to perform uplink transmission on the first carrier and the second carrier in time division multiplexing mode.

In a possible implementation, the first indication information is further used to indicate a quantity of radio frequency channels used on the first carrier and a quantity of radio frequency channels used on the second carrier when the terminal performs uplink transmission on the first carrier and the second carrier in time division multiplexing mode.

In a possible implementation, the quantity of radio frequency channels used on the first carrier when the terminal performs uplink transmission on the first carrier and the second carrier in time division multiplexing mode is equal to the quantity of radio frequency channels supported on the first carrier when the terminal performs uplink transmission on the first carrier and the second carrier in time division multiplexing mode.

In a possible implementation, the quantity of radio frequency channels used on the second carrier when the terminal performs uplink transmission on the first carrier and the second carrier in time division multiplexing mode is equal to the quantity of radio frequency channels supported on the second carrier when the terminal performs uplink transmission on the first carrier and the second carrier in time division multiplexing mode.

In a possible implementation, the processing unit is further configured to: determine a silent time domain resource, and keep silent within duration of the silent time domain resource, where a preceding symbol adjacent to the silent time domain resource belongs to a transmission time domain resource of the first carrier, and a subsequent symbol adjacent to the silent time domain resource belongs to a transmission time domain resource of the second carrier.

In a possible implementation, a length of the silent time domain resource is greater than or equal to the switching period between the first carrier and the second carrier.

According to a tenth aspect, a communication apparatus is provided. The apparatus has a function of implementing the method provided in the fifth aspect. The function may be implemented by hardware, or may be implemented by hardware executing corresponding software. The hardware or the software includes one or more units corresponding to the function. For example, the apparatus may include a communication unit and a processing unit. The processing unit is configured to perform a processing action (for example, an action other than sending and/or receiving) in the fifth aspect, and the communication unit is configured to perform a sending action and/or a receiving action in the fifth aspect. Optionally, the action performed by the communication unit is performed under control of the processing unit. Optionally, the communication unit includes a sending unit and a receiving unit. In this case, the sending unit is configured to perform the sending action in the fifth aspect, and the receiving unit is configured to perform the receiving action in the fifth aspect. The apparatus may exist in a product form of a chip.

For example, the communication apparatus provided in the tenth aspect includes a processing unit and a communication unit. The processing unit is configured to perform uplink transmission on N carriers in time division multiplexing mode by using the communication unit, where a quantity of radio frequency channels used on each of the N carriers is a quantity of radio frequency channels supported on the carrier when the communication apparatus performs uplink transmission on the N carriers in time division multiplexing mode, a quantity of radio frequency channels supported on a first carrier when the communication apparatus performs uplink transmission on the N carriers in time division multiplexing mode is greater than a quantity of radio frequency channels supported on the first carrier when the communication apparatus performs uplink transmission on the N carriers in simultaneous transmission mode, the first carrier is one of the N carriers, and N is an integer greater than 1.

In a possible implementation, the processing unit is further configured to send first capability information to a network device by using the communication unit, where the first capability information is used to indicate the quantity of radio frequency channels supported on each of the N carriers when the communication apparatus performs uplink transmission on the N carriers in time division multiplexing mode.

In a possible implementation, the processing unit is further configured to send second capability information to the network device by using the communication unit, where the second capability information is used to indicate a quantity of radio frequency channels supported on the first carrier and a quantity of radio frequency channels supported on a second carrier when the communication apparatus performs uplink transmission on the first carrier and the second carrier in simultaneous transmission mode.

In a possible implementation, the processing unit is further configured to receive first indication information from the network device by using the communication unit, where the first indication information is used to indicate the communication apparatus to perform uplink transmission on the N carriers in time division multiplexing mode; and the processing unit is specifically configured to perform, based on the first indication information, uplink transmission on the N carriers in time division multiplexing mode by using the communication unit.

In a possible implementation, the first indication information is further used to indicate the quantity of radio frequency channels used on each of the N carriers when the communication apparatus performs uplink transmission on the N carriers in time division multiplexing mode.

In a possible implementation, the processing unit is further configured to send inter-carrier switching period information to the network device by using the communication unit, where if a switching period between any two of the N carriers is the same, the inter-carrier switching period information indicates the switching period between any two of the N carriers; or if a switching period between two different carriers in the N carriers is different, the inter-carrier switching period information indicates the switching period between every two different carriers in the N carriers, or the inter-carrier switching period information indicates a switching period between two carriers with a longest switching period in the N carriers.

In a possible implementation, the processing unit is further configured to receive third indication information from the network device by using the communication unit, where the third indication information is used to indicate the communication apparatus to report the inter-carrier switching period information.

In a possible implementation, the N carriers are carriers between the communication apparatus and the network device.

In a possible implementation, the N carriers further include a carrier between the communication apparatus and a network device different from the network device.

In a possible implementation, the processing unit is further configured to perform uplink transmission on a third carrier by using the communication unit, where uplink transmission is performed on the third carrier and any one of the N carriers in simultaneous transmission mode within a first time range.

In a possible implementation, the N carriers include the first carrier and the second carrier.

In a possible implementation, the processing unit is further configured to switch from the first carrier to the second carrier within duration of a silent time domain resource, where a preceding symbol adjacent to the silent time domain resource belongs to a transmission time domain resource of the first carrier, and a subsequent symbol adjacent to the silent time domain resource belongs to a transmission time domain resource of the second carrier.

In a possible implementation, a length of the silent time domain resource is greater than or equal to the switching period between the first carrier and the second carrier.

In a possible implementation, the processing unit is specifically configured to switch one or more radio frequency channels from the first carrier to the second carrier within duration of the silent time domain resource.

According to an eleventh aspect, a communication apparatus is provided, and includes a processor. The processor is connected to a memory, the memory is configured to store computer-executable instructions, and the processor executes the computer-executable instructions stored in the memory, to implement any method provided in the first aspect, the second aspect, the third aspect, the fourth aspect, or the fifth aspect. The memory and the processor may be integrated together, or may be independent components. If the memory and the processor are independent components, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the communication apparatus further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

In a possible implementation, the communication apparatus exists in a product form of a chip.

According to a twelfth aspect, a computer-readable storage medium is provided, and includes instructions. When the instructions are run on a computer, the computer is enabled to perform any method provided in the first aspect, the second aspect, the third aspect, the fourth aspect, or the fifth aspect.

According to a thirteenth aspect, a computer program product including instructions is provided. When the instructions are run on a computer, the computer is enabled to perform any method provided in the first aspect, the second aspect, the third aspect, the fourth aspect, or the fifth aspect.

According to a fourteenth aspect, a chip is provided. The chip includes a processor and an interface circuit, and the interface circuit is coupled to the processor. The processor is configured to run a computer program or instructions, to implement the method according to any one of the first aspect to the fifth aspect. The interface circuit is configured to communicate with a module outside the chip.

For technical effects brought by any implementation of the sixth aspect to the fourteenth aspect, refer to the technical effects brought by a corresponding implementation of the first aspect, the second aspect, the third aspect, the fourth aspect, or the fifth aspect. Details are not described herein again.

It should be noted that various possible implementations of any one of the foregoing aspects may be combined provided that the solutions are not contradictory.

BRIEF DESCRIPTION OF DRAWINGS

FIG. 3 is a schematic diagram of a DC scenario;

FIG. 4A to FIG. 4C each are a schematic diagram of a slot configuration according to an embodiment of this application;

FIG. 8 is a schematic diagram of a slot configuration according to an embodiment of this application;

FIG. 9 is a flowchart of a communication method according to an embodiment of this application;

FIG. 10 and FIG. 11 each are a schematic diagram of a slot configuration according to an embodiment of this application;

FIG. 12 is a schematic diagram of composition of a communication apparatus according to an embodiment of this application;

FIG. 13 and FIG. 14 each are a schematic diagram of a hardware structure of a communication apparatus according to an embodiment of this application;

DESCRIPTION OF EMBODIMENTS

The following describes technical solutions in the embodiments of this application with reference to the accompanying drawings in the embodiments of this application. In descriptions of this application, unless otherwise specified, "/" means "or". For example, A/B may represent A or B. "And/or" in this specification describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, terms such as "first" and "second" are used in the embodiments of this application to distinguish between same objects or similar objects whose functions and purposes are basically the same. A person skilled in the art may understand that the terms such as "first" and "second" do not limit a quantity or an execution sequence, and that the terms such as "first" and "second" do not indicate a definite difference.

Figure 1:
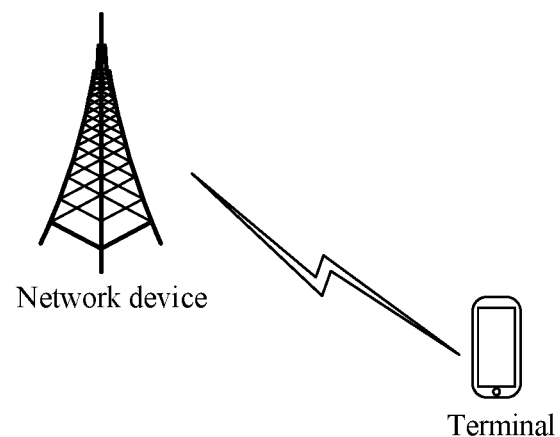
FIG. 1 is a schematic diagram of communication between a terminal and a network device.

An embodiment of this application provides a communication system. The communication system includes at least one network device and at least one terminal, and the at least one terminal may communicate with one or more of the at least one network device. One network device and one terminal are used as an example. Refer to FIG. 1. The network device and the terminal may perform wireless communication. It should be noted that the network device and the terminal included in the communication system shown in FIG. 1 are merely examples. In this embodiment of this application, a type and a quantity of network elements included in the communication system, and a connection relationship between the network elements are not limited thereto.

The communication system in this embodiment of this application may be a communication system supporting a fourth generation (fourth generation, 4G) access technology, for example, a long term evolution (long term evolution, LTE) access technology. Alternatively, the communication system may be a communication system supporting a fifth generation (fifth generation, 5G) access technology, for example, a new radio (new radio, NR) access technology. Alternatively, the communication system may be a communication system supporting a third generation (third generation, 3G) access technology, for example, a universal mobile telecommunications system (universal mobile telecommunications system, UMTS) access technology. Alternatively, the communication system may be a communication system supporting a plurality of wireless technologies, for example, a communication system supporting an LTE technology and an NR technology. In addition, the communication system is also applicable to a future-oriented communication technology.

The network device in this embodiment of this application may be a device that is on an access network side and that is configured to support a terminal in accessing the communication system, and for example, may be a base transceiver station (base transceiver station, BTS) or a base station controller (base station controller, BSC) in a communication system supporting a second generation (second generation, 2G) access technology, a NodeB (NodeB) or a radio network controller (radio network controller, RNC) in a communication system supporting a 3G access technology, an evolved NodeB (evolved NodeB, eNB) in a communication system supporting a 4G access technology, or a next generation NodeB (next generation NodeB, gNB), a transmission reception point (transmission reception point, TRP), a relay node (relay node), or an access point (access point, AP) in a communication system supporting a 5G access technology. The network device may be referred to as a base station, a node, an access network device, or the like.

The terminal in the embodiments of this application may be a device that provides a user with voice or data connectivity, and the terminal may also be referred to as user equipment (user equipment, UE), a mobile station (mobile station), a subscriber unit (subscriber unit), a station (station), or terminal equipment (terminal equipment, TE). For example, the terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a pad (pad), a smartphone (smartphone), customer premises equipment (customer premise equipment, CPE), or a sensor with a network access function. With development of wireless communication technologies, a device that can access the communication system, a device that can communicate with a network side in the communication system, or a device that can communicate with another object by using the communication system may be the terminal in this embodiment of this application, such as a terminal and a vehicle in intelligent transportation, a household device in a smart household, an electricity meter reading instrument or a voltage monitoring instrument in a smart grid, an environment monitoring instrument, or a video surveillance instrument or a cash register in an intelligent security network.

For ease of understanding of the embodiments of this application, the following first briefly describes related terms in this specification.

1. Slot (Slot)

A slot is a minimum scheduling unit of a time domain resource, and one slot includes at least one symbol. Symbols include an uplink symbol (that is, a symbol used for uplink transmission), a downlink symbol (that is, a symbol used for downlink transmission), and a flexible symbol (which may be used for uplink transmission or downlink transmission or as a guard interval depending on a network configuration). A slot in which all included symbols are uplink symbols may be referred to as an uplink slot, and is represented by U in the embodiments of this application. A slot in which all included symbols are downlink symbols may be referred to as a downlink slot, and is represented by D in the embodiments of this application. A slot in which included symbols are a plurality of symbols of an uplink symbol, a downlink symbol, and a flexible symbol may be referred to as a flexible slot, and is represented by S in the embodiments of this application.

In NR, according to different subcarrier spacings, one millisecond (ms) may include different quantities of slots. For example, when a subcarrier spacing is 15 kilohertz (kHz), 1 ms includes one slot, and the slot occupies 1 ms. When a subcarrier spacing is 30 kHz, 1 ms includes two slots, and each slot occupies 0.5 ms.

The uplink symbol may be referred to as, for example, a single carrier-frequency division multiple access (single carrier-frequency division multiple access, SC-FDMA) symbol or an orthogonal frequency division multiplexing (orthogonal frequency division multiplexing, OFDM) symbol. The downlink symbol may be referred to as, for example, an OFDM symbol.

2. Time Division Duplex (Time Division Duplex, TDD)

TDD is a duplex communication technology used to separate receiving and transmitting channels, that is, an uplink and a downlink, in a communication system. In a communication system using a TDD mode, a same frequency domain resource is used for an uplink and a downlink, and the uplink and the downlink are distinguished by using different time domain resources.

3. Frequency Division Duplex (Frequency Division Duplex, FDD)

FDD is a duplex communication technology used to separate receiving and transmitting channels, that is, an uplink and a downlink, in a communication system. In a communication system using an FDD mode, a same time domain resource is used for an uplink and a downlink, and the uplink and the downlink are distinguished by using different frequency domain resources. For example, an uplink frequency range is different from a downlink frequency range.

4. Multi-Carrier Uplink Transmission

The multi-carrier uplink transmission means that a plurality of carriers exist between a terminal and a network device in an uplink direction. The terminal may access one network device, and the plurality of carriers may include a carrier between the terminal and the network device. Alternatively, the terminal may simultaneously access two network devices, and the plurality of carriers may include a carrier between the terminal and each of the two network devices.

For example, the multi-carrier uplink transmission may include carrier aggregation (carrier aggregation, CA) and dual connectivity (dual connectivity, DC).

For example, during the multi-carrier uplink transmission, uplink transmission may be performed in time division multiplexing (time division multiplexing, TDM) mode, or uplink transmission may be performed in simultaneous transmission mode.

5. CA

Figure 2:
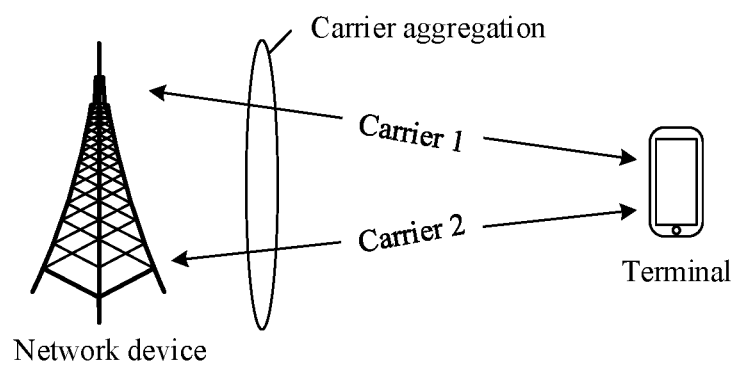
FIG. 2 is a schematic diagram of a CA scenario.

CA is a technology that aggregates two or more carriers to support a larger transmission bandwidth. CA can be classified into uplink CA and downlink CA. For uplink CA, a terminal may simultaneously receive or transmit data on a plurality of carriers according to a capability of the terminal. For example, refer to FIG. 2. The terminal may perform uplink CA on a carrier 1 and a carrier 2, so that a larger uplink transmission bandwidth is supported between a network device and the terminal, and uplink transmission performance is improved.

6. DC

In a current communication system, a terminal is supported in simultaneously accessing two different nodes, and this access mode is referred to as DC. In this case, the terminal may perform transmission by using radio resources of one or both of the two nodes, and the two nodes may be of a same RAT (radio access technology) or different RATs.

One of the two different nodes is a primary node and the other is a secondary node. A link between the two nodes may be a non-ideal backhaul link, or may be an ideal backhaul link. The two different nodes may be different network devices, or may be different modules in a same network device, where one module may correspond to one cell.

For example, the two different nodes may be two base stations in an evolved packet core (evolved packet core, EPC) non-standalone (Non-Standalone, NSA) networking scenario. In this case, the two base stations may be an LTE base station and an NR base station. Alternatively, the two different nodes may be two base stations in a standalone (Standalone, SA) networking scenario. In this case, both of the two base stations may be LTE base stations or NR base stations. A DC scenario in which both of the base stations are NR base stations may be referred to as an NR DC scenario. A DC scenario in which both of the base stations are LTE base stations may be referred to as an LTE DC scenario.

For example, DC may be multi-RAT (multi-RAT, MR)-DC, and MR-DC may include evolved universal terrestrial radio access (Evolved Universal Terrestrial Radio Access, E-UTRA)-NR DC (E-UTRA-NR Dual Connectivity, EN-DC), next generation (Next Generation, NG) radio access network (Radio Access Network, RAN) E-UTRA-NR DC (NG-RAN E-UTRA-NR Dual Connectivity, NGEN-DC), NR-E-UTRA DC (NR-E-UTRA Dual Connectivity, NE-DC), or NR-DC (NR-DC).

The terminal may communicate with one of the two different nodes by using a plurality of carriers. For example, refer to FIG. 3. If the two different nodes are an LTE base station and an NR base station, the terminal may communicate with the LTE base station by using a plurality of carriers, and uplink CA and/or downlink CA may be performed on the plurality of carriers. Alternatively, the terminal may communicate with the NR base station by using a plurality of carriers, and uplink CA and/or downlink CA may be performed on the plurality of carriers.

7. Multi-Carrier TDM

TDM transmission is a data transmission mode. When a terminal performs transmission on a plurality of carriers in TDM mode, a time domain resource used for uplink transmission on each carrier in the plurality of carriers does not overlap a time domain resource used for uplink transmission on any other carrier in the plurality of carriers. The plurality of carriers may be some or all of carriers supported by the terminal. It may be understood that uplink transmission on the plurality of carriers is performed by using different time domain resources.

Figures 3, 4A:
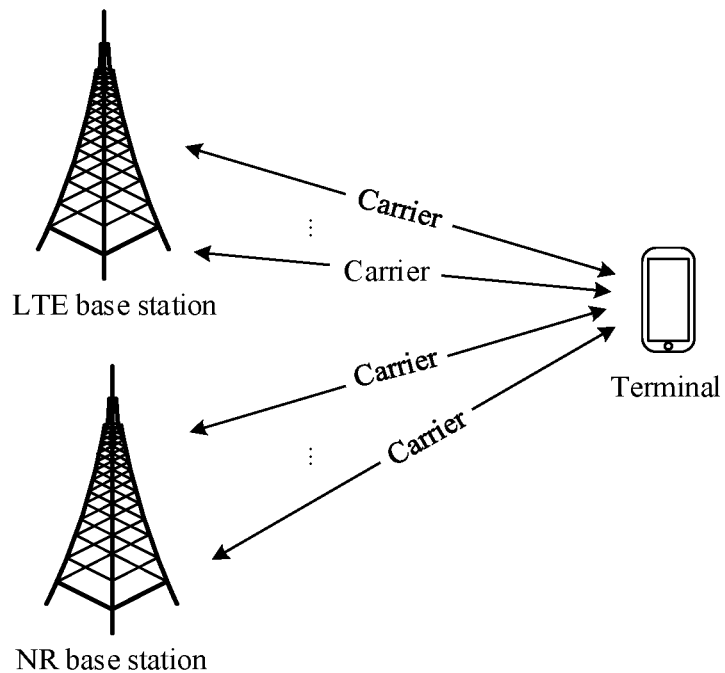

For example, for a 2.6 gigahertz (GHz) carrier (2.6 G carrier for short) and a 3.5 GHz carrier (3.5 G carrier for short), if slot configurations of the two carriers are shown in FIG. 4A, the terminal may perform uplink transmission on the 2.6 G carrier in a slot 3 corresponding to the 2.6 G carrier, and the terminal may perform uplink transmission on the 3.5 G carrier in a slot 9 corresponding to the 3.5 G carrier and a slot 4 corresponding to the 3.5 G carrier (that is, the first half slot of a slot 2 corresponding to the 2.6 G carrier). In this case, TDM transmission is performed on the 2.6 G and 3.5 G carrier.

It should be noted that uplink slots in FIG. 4A, FIG. 4B, FIG. 4C, FIG. 8, FIG. 10, and FIG. 11 in the embodiments of this application are slots filled with diagonal lines.

The TDM mode may also be referred to as a time-based transmission mode, a single-transmission mode, or the like.

8. Simultaneous Transmission on a Plurality of Carriers

Simultaneous transmission is a data transmission mode. When a terminal performs simultaneous transmission on a plurality of carriers, a time domain resource used for uplink transmission on each carrier in the plurality of carriers overlaps a time domain resource used for uplink transmission on each of the other carriers. The plurality of carriers may be some or all of carriers supported by the terminal.

For example, refer to FIG. 4A. In the first half slot of the slot 2 corresponding to the 2.6 G carrier (that is, the slot 4 corresponding to the 3.5 G carrier), the terminal simultaneously performs uplink transmission on the 2.6 G carrier and the 3.5 G carrier. In this case, in the first half slot of the slot 2 corresponding to the 2.6 G carrier (that is, the slot 4 corresponding to the 3.5 G carrier), the 2.6 G carrier and the 3.5 G carrier are used for simultaneous transmission.

It should be noted that, for an uplink time domain resource overlapped for a plurality of carriers, whether TDM transmission or simultaneous transmission is performed on the plurality of carriers can be determined depending on how transmission is performed on the plurality of carriers by using the overlapping uplink time domain resource. For example, for a 2.6 G carrier and a 3.5 G carrier, slot configurations of the two carriers are shown in FIG. 4B. If the terminal performs transmission by using the 3.5 G carrier in a slot 4 and a slot 9 corresponding to the 3.5 G carrier, and the terminal performs transmission by using the 2.6 G carrier only in a slot 3 corresponding to the 2.6 G carrier, uplink transmission is performed on the 3.5 G carrier and the 2.6 G carrier in TDM mode. If the terminal performs transmission by using the 3.5 G carrier in the slot 4 and the slot 9 corresponding to the 3.5 G carrier, and the terminal performs transmission by using the 2.6 G carrier in a slot 2, the slot 3, and a slot 4 corresponding to the 2.6 G carrier, in the slot 4 and the slot 9 corresponding to the 3.5 G carrier, the 3.5 G carrier and the 2.6 G carrier are used for simultaneous transmission.

In addition, it should be noted that the terminal may support a plurality of carriers, and in the plurality of carriers, some carriers may be used for TDM transmission, and some carriers may be used for simultaneous transmission. For example, as shown in FIG. 4C, the terminal performs transmission on a 3.5 G carrier in a slot 4 and a slot 9 corresponding to the 3.5 G carrier, performs transmission on a 2.6 G carrier in a slot 3 corresponding to the 2.6 G carrier, and performs transmission on a 1.8 GHz carrier (1.8 G carrier for short) in a slot 0 to a slot 4 corresponding to the 1.8 G carrier. In this case, TDM transmission is performed on the 3.5 G carrier and the 2.6 G carrier, simultaneous transmission is performed on the 3.5 G carrier and the 1.8 G carrier in the slot 4 and the slot 9 corresponding to the 3.5 G carrier, and simultaneous transmission is performed on the 2.6 G carrier and the 1.8 G carrier in the slot 3 corresponding to the 2.6 G carrier.

9. Radio Frequency Channel Capability of a Carrier

A radio frequency channel capability of a carrier represents a quantity of radio frequency channels that can be supported (that is, a maximum quantity that can be used) on the carrier during transmission. For example, refer to FIG. 5. A carrier 1 may support two radio frequency channels: a radio frequency channel 1 and a radio frequency channel 2; and a carrier 2 supports only one radio frequency channel: the radio frequency channel 2.

A radio frequency channel capability of a carrier may be represented by a quantity of multiple-input multiple-output (multiple-input multiple-output, MIMO) layers, a sounding reference signal (sounding reference signal, SRS) antenna selection capability, and the like of the carrier. The SRS antenna selection capability refers to quantities of transmit antennas and receive antennas supported on the carrier. If the quantity of transmit antennas is denoted as x, the quantity of receive antennas is denoted as y, a transmit antenna is denoted as T, and a receive antenna is denoted as R, the SRS antenna selection capability of the carrier may be denoted as xTyR, where both x and y are integers greater than 0.

A quantity of MIMO layers of a carrier is the same as a quantity of radio frequency channels supported on the carrier. For example, a maximum quantity of MIMO layers of a carrier is the same as a quantity of radio frequency channels supported on the carrier. A quantity of transmit antennas in an SRS antenna selection capability of a carrier is the same as a quantity of radio frequency channels supported on the carrier. For example, a maximum quantity of transmit antennas in an SRS antenna selection capability of a carrier is the same as a quantity of radio frequency channels supported on the carrier.

When the terminal actually sends data on a carrier, a quantity of radio frequency channels used on the carrier may be less than or equal to a quantity of radio frequency channels supported on the carrier. For example, the carrier may fully use a radio frequency channel capability of the carrier, that is, the quantity of used radio frequency channels is equal to the quantity of radio frequency channels supported on the carrier.

Optionally, the radio frequency channel capability of the carrier may affect capabilities of another terminal, for example, an uplink transmit power. The radio frequency channel capability of the carrier may be indicated by using the capability of the another terminal. This is not limited in the embodiments of this application.

10. Radio Frequency Channel Sharing Mechanism

One carrier may support one or more radio frequency channels. During actual implementation, different carriers may share a radio frequency channel, that is, a same radio frequency channel may be used on different carriers in different periods. For example, refer to FIG. 5. The carrier 1 may support the radio frequency channel 1 and the radio frequency channel 2, and the carrier 2 supports only the radio frequency channel 2. The radio frequency channel 2 may be used on different carriers in different periods. For example, in a period 1, the radio frequency channel 2 may be used on the carrier 1. In this case, in the period 1, a switch 1 works in a state 1. In a period 2, the radio frequency channel 2 may be used on the carrier 2. In this case, in the period 2, the switch 1 works in a state 2.

11. Radio Frequency Channel Capability Supported on Each of a Plurality of Carriers When TDM Transmission is Performed on the Plurality of Carriers It may be understood that, when TDM transmission is performed on a plurality of carriers, a radio frequency channel capability supported on each carrier may be the same as a radio frequency channel capability supported on the carrier when the carrier independently works.

12. Radio Frequency Channel Capability Supported on Each of a Plurality of Carriers When Simultaneous Transmission is Performed on the Plurality of Carriers It may be understood that there is at least one moment at which simultaneous transmission is performed on a plurality of carriers, and at the moment, a radio frequency channel capability supported on each carrier is a radio frequency channel capability supported on the carrier when simultaneous transmission is performed on the plurality of carriers.

It should be noted that, when the terminal reports the radio frequency channel capability supported on each carrier when simultaneous transmission is performed on the plurality of carriers, a network side and the terminal may not distinguish moments at which simultaneous transmission is performed or not on the plurality of carriers, and may perform scheduling on all time domain resources based on a quantity of radio frequency channels supported on each carrier when simultaneous transmission is performed on the carriers.

For example, at a moment t1, simultaneous transmission is performed on a carrier 1 and a carrier 2, a quantity of radio frequency channels supported on the carrier 1 is 1, and a quantity of radio frequency channels supported on the carrier 2 is 1. In this case, when simultaneous transmission is performed on the carrier 1 and the carrier 2, the quantity of radio frequency channels supported on the carrier 1 is 1, and the quantity of radio frequency channels supported on the carrier 2 is 1. The network side may perform scheduling on all time domain resources based on that the quantity of radio frequency channels supported on the carrier 1 is 1 and that the quantity of radio frequency channels supported on the carrier 2 is 1.

The communication system in the embodiments of this application supports uplink transmission on a plurality of carriers. The terminal may perform uplink transmission on the plurality of carriers in TDM mode, or may perform uplink transmission on the plurality of carriers in simultaneous transmission mode. In the two cases, the network device cannot further distinguish between capabilities of the terminal. For example, in FIG. 5, regardless of the TDM mode or the simultaneous transmission mode, the terminal always performs uplink transmission on the carrier 1 by using the radio frequency channel 1, and the terminal always performs uplink transmission on the carrier 2 by using the radio frequency channel 2. In other words, the terminal performs uplink transmission on each carrier by using one radio frequency channel. The uplink transmission capability of the terminal is restricted. Therefore, the embodiments of this application provide a communication method. In the communication method, a terminal may report, to a network device, a capability of the terminal when performing uplink transmission in TDM mode, for example, a quantity of radio frequency channels supported on each carrier when the terminal performs uplink transmission in TDM mode, so that the network device can configure, for the terminal based on an actual capability of the terminal, a quantity of radio frequency channels used on each carrier in TDM mode. This improves an uplink transmission capability of the terminal.

It should be noted that the method provided in the embodiments of this application may be applied to any multi-carrier scenario. In this case, the terminal may be located in an overlapping coverage area of a plurality of carriers, and the terminal may select different carriers for uplink transmission. The multi-carrier scenario includes but is not limited to any one of the foregoing DC scenarios or CA scenarios.

Figure 6A:
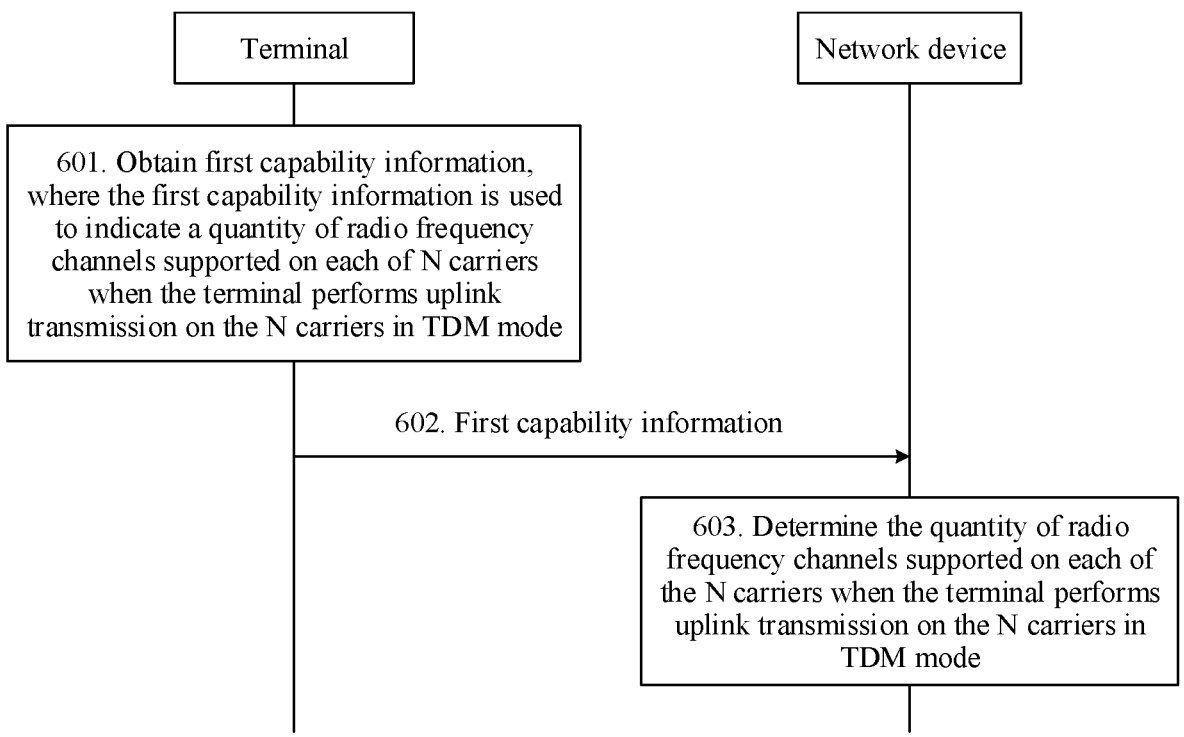
FIG. 6A, FIG. 6B, and FIG. 7A each are a flowchart of a communication method according to an embodiment of this application.

To improve an uplink transmission capability of a terminal, an embodiment of this application provides a communication method. As shown in FIG. 6A, the method includes the following steps.

601. A terminal obtains first capability information, where the first capability information is used to indicate a quantity of radio frequency channels supported on each of N carriers when the terminal performs uplink transmission on the N carriers in TDM mode.

N is an integer greater than 1. For example, N may be 2, 3, 4, or an integer greater than 4.

For example, when N is 2, the first capability information is used to indicate a quantity of radio frequency channels supported on a first carrier and a quantity of radio frequency channels supported on a second carrier when uplink transmission is performed on the first carrier and the second carrier in TDM mode.

Optionally, the terminal may obtain second capability information, where the second capability information is used to indicate a quantity of radio frequency channels supported on each of the N carriers when the terminal performs uplink transmission on the N carriers in simultaneous transmission mode.

For example, when N is 2, the second capability information is used to indicate a quantity of radio frequency channels supported on the first carrier and a quantity of radio frequency channels supported on the second carrier when uplink transmission is performed on the first carrier and the second carrier in simultaneous transmission mode.

Optionally, a quantity of radio frequency channels supported on the first carrier when the terminal performs uplink transmission on the N carriers in TDM mode is greater than a quantity of radio frequency channels supported on the first carrier when the terminal performs uplink transmission on the N carriers in simultaneous transmission mode, where the first carrier is any one of the N carriers.

Optionally, the first capability information and/or the second capability information may be stored in the terminal. For example, when the terminal is delivered from a factory, the terminal carries the first capability information and/or the second capability information. Alternatively, the terminal may generate the first capability information and/or the second capability information.

Optionally, the N carriers may be some or all of carriers supported by the terminal. When uplink transmission is performed on the N carriers in TDM mode, TDM transmission may be performed on each carrier in the N carriers and one or more other carriers in the N carriers. When uplink transmission is performed on the N carriers in simultaneous transmission mode, simultaneous transmission may be performed on each carrier in the N carriers and one or more other carriers in the N carriers. This is not limited in this embodiment of this application.

Optionally, when the terminal performs uplink transmission on the N carriers in TDM mode, quantities of radio frequency channels supported on different carriers in the N carriers may be the same or different. When the terminal performs uplink transmission on the N carriers in simultaneous transmission mode, quantities of radio frequency channels supported on different carriers in the N carriers may be the same or different.

Optionally, different carriers in the N carriers may share a radio frequency channel, or each may exclusively use a radio frequency channel. This is not specifically limited in this embodiment of this application.

Optionally, the N carriers include a carrier between the terminal and a network device. Optionally, the N carriers further include a carrier between the terminal and another network device (for example, a secondary network device) different from the network device (for example, a primary network device).

For example, the network device is a primary network device of the terminal. In one case, the N carriers include only a carrier for communicating with the primary network device, that is, CA may be performed on the N carriers. In another case, in addition to the primary network device, the terminal further accesses a secondary network device. The N carriers not only include a carrier for communicating with the primary network device of the terminal, but also include a carrier for communicating with the secondary network device of the terminal. That is, the N carriers are a plurality of carriers in a DC scenario, or the N carriers may include only a carrier for communication between the terminal and the secondary network device.

602. The terminal sends the first capability information to the network device.

Correspondingly, the network device receives the first capability information from the terminal.

Optionally, the terminal sends the second capability information to the network device. Correspondingly, the network device receives the second capability information from the terminal.

Optionally, the first capability information may include a quantity of radio frequency channels supported on each carrier when the terminal performs TDM transmission on a plurality of carriers (which may also be understood as a plurality of frequency bands), for example, a quantity of radio frequency channels supported on n3 and a quantity of radio frequency channels supported on n78 when the terminal performs TDM transmission on n3 and n78.

Optionally, the second capability information may include a quantity of radio frequency channels supported on each carrier when the terminal performs simultaneous transmission on a plurality of carriers (which may also be understood as a plurality of frequency bands), for example, a quantity of radio frequency channels supported on n41 and a quantity of radio frequency channels supported on n79 when the terminal performs simultaneous transmission on n41 and n79.

n3 is an FDD frequency band, and n78, n41, and n79 are TDD frequency bands. n3, n78, n41, and n79 each correspond to one spectral range.

Optionally, the first capability information and the second capability information may be included in capability information of the terminal. The capability information of the terminal may further include a quantity of radio frequency channels supported when the terminal works separately on a single carrier (or may be understood as a single frequency band), for example, a quantity of radio frequency channels supported when the terminal works separately on n3 or n78.

Optionally, the method further includes: The network device sends fourth indication information to the terminal, where the fourth indication information is used to indicate the terminal to report the first capability information. Correspondingly, the terminal receives the fourth indication information from the network device.

The fourth indication information may be carried in a system message broadcast by the network device, or may be carried in a message (for example, a radio resource control (radio resource control, RRC) message) specially sent by the network device to the terminal.

The terminal may perform step 602 based on an indication of the fourth indication information, may periodically perform step 602, or may perform step 602 according to a preset policy. Alternatively, the network device does not send the fourth indication information to the terminal, and the terminal actively performs step 602. This is not specifically limited in this embodiment of this application.

603. The network device determines the quantity of radio frequency channels supported on each of the N carriers when the terminal performs uplink transmission on the N carriers in TDM mode.

According to the method provided in this embodiment of this application, the terminal may report, to the network device, the quantity of radio frequency channels supported on each carrier when the terminal performs uplink transmission in TDM mode, so that the network device can configure, for the terminal based on an actual capability of the terminal, a quantity of radio frequency channels used on each carrier in TDM mode. This improves an uplink transmission capability of the terminal.

During specific implementation, the first capability information may directly indicate the quantity of radio frequency channels supported on each carrier when the terminal performs uplink transmission on the N carriers in TDM mode (denoted as an indication manner 1), or may indirectly indicate the quantity of radio frequency channels supported on each carrier when the terminal performs uplink transmission on the N carriers in TDM mode (denoted as an indication manner 2). The following separately describes the two indication manners.

Indication Manner 1: Direct Indication

In the indication manner 1, in a possible implementation, for each of the N carriers, the first capability information may indicate, by using one or more bits (bit), the quantity of radio frequency channels supported on the carrier when the terminal performs uplink transmission on the N carriers in TDM mode.

In another possible implementation, the terminal may report, to the network device, the N carriers that are used to perform uplink transmission in TDM mode, and indicate, by using one bit, that a radio frequency channel capability of each of the N carriers is the same as a radio frequency channel capability supported when the carrier independently works. In this case, the network device may determine, based on a radio frequency channel capability reported by the terminal and supported when the signal carrier works, the quantity of radio frequency channels supported on each of the N carriers when the terminal performs uplink transmission on the N carriers in TDM mode.

Indication Manner 2: Indirect Indication

In the indication manner 2, the first capability information may indicate, by using another capability parameter, the quantity of radio frequency channels supported on each of the N carriers when the terminal performs uplink transmission on the N carriers in TDM mode. For example, the first capability information may indicate the quantity by using a quantity of MIMO layers, a quantity of transmit antennas in an SRS antenna selection capability, and the like.

Optionally, when the terminal performs uplink transmission on the N carriers in TDM mode, and a quantity of MIMO layers of one carrier is A, a quantity of radio frequency channels supported on the carrier is A; or when a quantity of transmit antennas of one carrier is B, a quantity of radio frequency channels supported on the carrier is B.

For example, it is assumed that the N carriers are separately a 3.5 G carrier, a 1.8 G carrier, and a 900 MHz carrier (900 M carrier for short). When the terminal performs uplink transmission on the three carriers in TDM mode, if a quantity of MIMO layers of the 3.5 G carrier is 4 and/or an SRS antenna selection capability of the 3.5 G carrier is 4T8R (indicating 4 transmit antennas and 8 receive antennas), it indicates that a quantity of radio frequency channels supported on the 3.5 G carrier is 4. If a quantity of MIMO layers of the 1.8 G carrier is 2 and/or an SRS antenna selection capability of the 1.8 G carrier is 2T4R (indicating two transmit antennas and four receive antennas), it indicates that a quantity of radio frequency channels supported on the 1.8 G carrier is 2. If a quantity of MIMO layers of the 900 M carrier is 2 and/or an SRS antenna selection capability of the 900 M carrier is 2T4R (indicating two transmit antennas and four receive antennas), it indicates that a quantity of radio frequency channels supported on the 900 M carrier is 2.

During specific implementation of step 602, the terminal may send the first capability information to the network device over an air interface in the following first manner or second manner.

First manner: The transmission is implemented by using signaling specified in a communication protocol.

In the first manner, the first capability information may be carried in signaling such as an RRC response, uplink control information (uplink control information, UCI), and a medium access control (media access control, MAC) control element (control element, CE).

During specific implementation, the first manner may be implemented in any one of the following manner 1 or manner 2.

Manner 1: A parameter is added to an existing information element, and the parameter is the first capability information.

For example, in section 6.3.3 in 3GPP technical specification (technical specification, TS) 38.331 version (version, V) 15.2.1, feature set combination ("featureSetCombination") included in sequence (sequence) in band combination ("BandCombination") in an information element of band combination list ("BandCombinationList"), may be used to report a radio frequency channel capability supported on each carrier when the N carriers work together. An information element of feature set combination for single transmission ("featureSetCombinationforSingleUL") may be added to "BandCombination", and "featureSetCombinationforSingleUL" is used to report a radio frequency channel capability supported on each carrier when TDM transmission is performed on the N carriers. Both newly added "featureSetCombinationforSingleUL" and existing "featureSetCombination" may include content in an information element of feature set combination identifier ("FeatureSetCombinationId"). For example, information included in the information element "BandCombination" may be:

```
BandCombination ::=                    SEQUENCE {
    ...
    featureSetCombination              FeatureSetCombinationId,
    featureSetCombinationforSingleUL   FeatureSetCombinationId,
    ...
}
```

In "featureSetCombinationforSingleUL", the foregoing indication manner 2 may be used to indicate the quantity of radio frequency channels supported on each carrier when the terminal performs uplink transmission on the N carriers in TDM mode.

Manner 2: An information element is added to existing signaling, where the information element includes the first capability information.

For example, only one type of "BandCombination" is reported for an existing band combination obtained by combining a plurality of carriers, and additional band combination "BandCombination" may be reported for the band combination obtained by combining the plurality of carriers of the terminal. The newly added information element "BandCombination" is used to report a radio frequency channel capability supported on each carrier when TDM transmission is performed on N carriers. In "BandCombination", the foregoing indication manner 2 may be used to indicate the quantity of radio frequency channels supported on each carrier when the terminal performs uplink transmission on the N carriers in TDM mode. For details about information contained in "BandCombination", refer to "BandCombination" in the information element "BandCombinationList" in section 6.3.3 in 3GPP TS 38.331 V15.2.1.

Second manner: The transmission is implemented in a device-pipe synergy manner.

In the second manner, the first capability information may be carried in a private message. The terminal may report the first capability information to a network device (for example, an LTE base station or an NR base station) that supports a device-pipe synergy function. During specific implementation, the terminal may identify, based on system information (for example, SIB1) broadcast by a network device, a network device that supports the device-pipe synergy function, and may report the first capability information by using a private message. A field may be extended in the system information, and indication information may be added to the field. The indication information may indicate whether a network device that sends the system information is a network device that supports a device-pipe synergy capability. For example, if the system information is SIB1, a field extended in SIB1 may be located in a zero padding (padding) part in SIB1.

The foregoing describes the specific implementation of the first capability information. It should be noted that in this embodiment of this application, there is another implementation of the first capability information. This is not limited in this embodiment of this application.

Optionally, in the method shown in FIG. 6A, before step 603, the terminal may report, to the network device, information about whether the terminal has a capability of performing uplink transmission in TDM mode, so that the network device determines whether to configure, for the terminal, a manner of performing uplink transmission in TDM mode.

Optionally, the information about whether the terminal has the capability of performing uplink transmission in TDM mode and the first capability information may be carried in a same message, and the information about whether the terminal has the capability of performing uplink transmission in TDM mode may be carried in the first capability information, or may not be carried in the first capability information. Alternatively, the information about whether the terminal has the capability of performing uplink transmission in TDM mode and the first capability information may be carried in different messages.

Optionally, the terminal may report, to the network device, the information about whether the terminal has the capability of performing uplink transmission in TDM mode before step 602, in step 602, or after step 602.

For example, in an MR-DC scenario, the terminal may indicate, by using an information element (or a parameter) of single UL-transmission ("singleUL-Transmission") or TDM pattern ("tdm-Pattern"), whether the terminal has the capability of performing uplink transmission in TDM mode. For example, when the terminal sets the information element (or parameter) "singleUL-Transmission" or "tdm-Pattern" to "supported", it indicates that the terminal has the capability of performing uplink transmission in TDM mode; otherwise, it indicates that the terminal does not have the capability of performing uplink transmission in TDM mode.

Figure 6B:
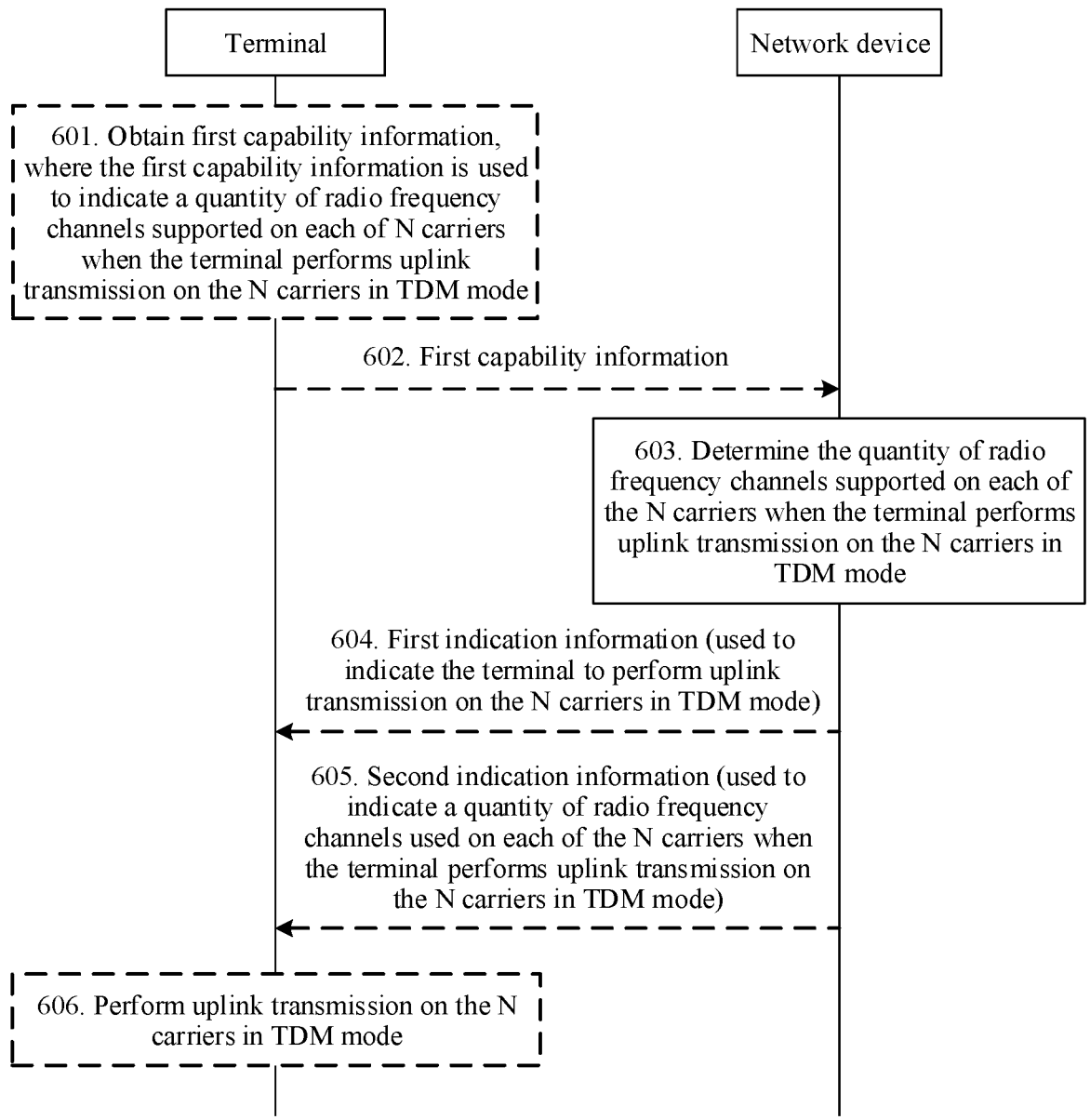

Optionally, refer to FIG. 6B. The method further includes:
604. The network device sends first indication information to the terminal, where the first indication information is used to indicate the terminal to perform uplink transmission on the N carriers in TDM mode. Correspondingly, the terminal receives the first indication information from the network device, and performs uplink transmission on the N carriers in TDM mode based on an indication of the first indication information.

Optionally, refer to FIG. 6B. The method further includes:
605. The network device sends second indication information to the terminal, where the second indication information is used to indicate a quantity of radio frequency channels used on each of the N carriers when the terminal performs uplink transmission on the N carriers in TDM mode. Correspondingly, the terminal receives the second indication information from the network device, and performs uplink transmission on the N carriers in TDM mode based on the second indication information.

The quantity of radio frequency channels used on each of the N carriers may be less than or equal to the quantity of radio frequency channels supported on the carrier when the terminal performs uplink transmission on the N carriers in TDM mode. For example, the quantity of radio frequency channels used on each of the N carriers may be equal to the quantity of radio frequency channels supported on the carrier when the terminal performs uplink transmission on the N carriers in TDM mode. This can ensure that each carrier has a maximum radio frequency channel capability when the terminal performs uplink transmission on the N carriers in TDM mode, thereby improving an uplink transmission capability of the terminal.

For step 604 and step 605, only step 604 may exist, only step 605 may exist, or both step 604 and step 605 may exist. The first indication information and the second indication information may be carried in a same message, or may be carried in different messages.

Optionally, refer to FIG. 6B. The method further includes:
606. The terminal performs uplink transmission on the N carriers in TDM mode. Correspondingly, the network device performs uplink receiving on one or more of the N carriers in TDM mode.

It should be noted that, in a DC scenario, when performing uplink transmission on N carriers in TDM mode, the terminal may send data to a plurality of network devices. One network device may perform uplink receiving on one carrier in the N carriers, or may perform uplink receiving on a plurality of carriers in the N carriers.

During specific implementation of step 606, in one case, both step 604 and step 605 exist. The terminal may determine, based on the first indication information, to perform uplink transmission in TDM mode, and then determine, based on the second indication information, a quantity of carriers used for performing uplink transmission in TDM mode and a quantity of radio frequency channels used on each carrier, to perform uplink transmission on the N carriers in TDM mode. In another case, only step 605 exists, and step 604 does not exist. Step 605 may be understood as that the network device indicates the terminal to perform uplink transmission in TDM mode, and further indicates a quantity of carriers used for performing uplink transmission in TDM mode and a quantity of radio frequency channels used on each carrier, to perform uplink transmission on the N carriers in TDM mode. In another case, only step 604 exists, and step 605 does not exist. When the network device indicates the terminal to perform uplink transmission on the N carriers in TDM mode, the terminal may perform uplink transmission on the N carriers in TDM mode based on the quantity, reported by the terminal, of radio frequency channels supported on each carrier when uplink transmission is performed on the N carriers in TDM mode.

The foregoing describes, with reference to FIG. 6A and FIG. 6B, how to report the quantity of radio frequency channels supported on each carrier when the terminal performs uplink transmission on the N carriers in TDM mode. Refer to FIG. 6B. It should be noted that, step 601 and step 602 may alternatively be optional steps. In this case, during specific implementation of step 603, the network device may determine that a radio frequency channel capability (for example, a quantity of supported radio frequency channels) supported on each of the N carriers when the terminal performs uplink transmission on the N carriers in TDM mode is the same as a radio frequency channel capability supported on the carrier when the carrier independently works, to determine the quantity of radio frequency channels supported on each carrier when the terminal performs uplink transmission on the N carriers in TDM mode.

Figure 7A:
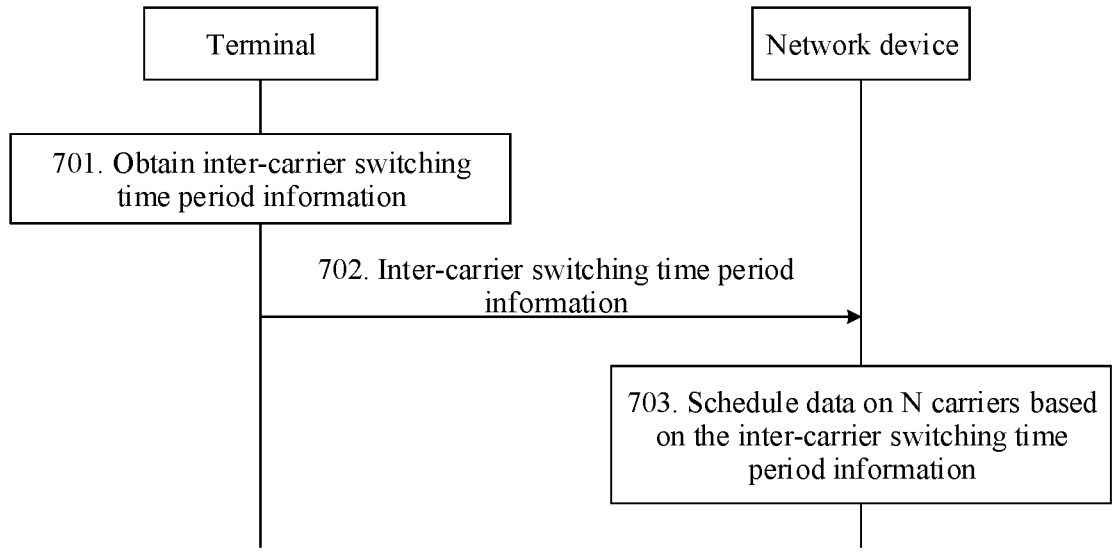

In multi-carrier uplink transmission in the embodiments of this application, when a terminal changes from performing uplink transmission on one carrier (for example, a carrier 1) to performing uplink transmission on another carrier (for example, a carrier 2), the terminal needs to switch from the carrier 1 to the carrier 2. The switching process requires a specific period of time, which is referred to as an inter-carrier switching period. Particularly, when a plurality of carriers share one or more radio frequency channels in TDM mode, the one or more radio frequency channels may need to be switched from one carrier to another carrier. The network device needs to reserve time for performing inter-carrier switching for the one or more radio frequency channels during scheduling, to ensure that the quantity of radio frequency channels used on each carrier does not decrease when the terminal performs uplink transmission in TDM mode. In view of this, an embodiment of this application further provides a communication method. As shown in FIG. 7A, the method includes the following steps.

701. A terminal obtains inter-carrier switching period information.

The inter-carrier switching period information is used to indicate a switching period between carriers. Optionally, an inter-carrier switching period may be duration of a time range or duration of a period, and the inter-carrier switching period may be represented by using an OFDM symbol. For example, the inter-carrier switching period may be one OFDM symbol, or two or more OFDM symbols. The inter-carrier switching period may alternatively be represented by using a time value. For example, the inter-carrier switching period may be 0 microseconds (μs), 30 μs, 140 μs, or another value.

Optionally, the terminal performs uplink transmission on N carriers in TDM mode. The inter-carrier switching period information may indicate a switching period between every two carriers in the N carriers or a switching period between two carriers with a longest switching period in the N carriers. There are the following several cases for the inter-carrier switching period information:

First case: If a switching period between any two of the N carriers is the same, the inter-carrier switching period information indicates the switching period between any two of the N carriers. For example, if N=3, and a switching period between any two of the three carriers is 5 μs, the inter-carrier switching period information may be a value, that is, 5 μs. It may be understood that, in this case, the inter-carrier switching period may be considered to indicate a switching period between every two carriers in the N carriers, and the switching period between every two carriers in the N carriers is the same.

Second case: If a switching period between any two different carriers in the N carriers is different, the inter-carrier switching period information indicates the switching period between every two different carriers in the N carriers. For example, if N=3, a switching period between the first carrier and the second carrier in the three carriers is 0 μs, a switching period between the second carrier and the third carrier is 5 μs, and a switching period between the first carrier and the third carrier is 10 μs, the inter-carrier switching period information may be 0 μs, 5 μs, and 10 μs.

Third case: The inter-carrier switching period information indicates a switching period between two carriers with a longest switching period in the N carriers. For example, if N=3, a switching period between the first carrier and the second carrier in the three carriers is 0 μs, a switching period between the second carrier and the third carrier is 5 μs, and a switching period between the first carrier and the third carrier is 10 μs, the inter-carrier switching period information may be 10 μs.

The following uses a switching period between two of the N carriers as an example for description.

Optionally, for any two carriers (denoted as a carrier A and a carrier B) in the N carriers, a switching period may include a period of switching from the carrier A to the carrier B, or comprises a period of switching from the carrier B to the carrier A, or comprises both the period of switching from the carrier A to the carrier B and the period of switching from the carrier B to the carrier A. The period of switching from the carrier A to the carrier B and the period of switching from the carrier B to the carrier A may be different or the same.

Optionally, the switching period between the carrier A and the carrier B may be a larger value of the period of switching from the carrier B to the carrier A and the period of switching from the carrier A to the carrier B, or an average value of the period of switching from the carrier A to the carrier B and the period of switching from the carrier B to the carrier A.

Optionally, the carrier A and the carrier B may share one or more radio frequency channels. That is, at different time points, both the carrier A and the carrier B may perform uplink transmission by using the one or more radio frequency channels. The period of switching from the carrier A to the carrier B may be a period of switching the one or more radio frequency channels from the carrier A to the carrier B. Specifically, the period of switching from the carrier A to the carrier B may be obtained based on a period of switching each of the one or more radio frequency channels from the carrier A to the carrier B.

Figure 7B:
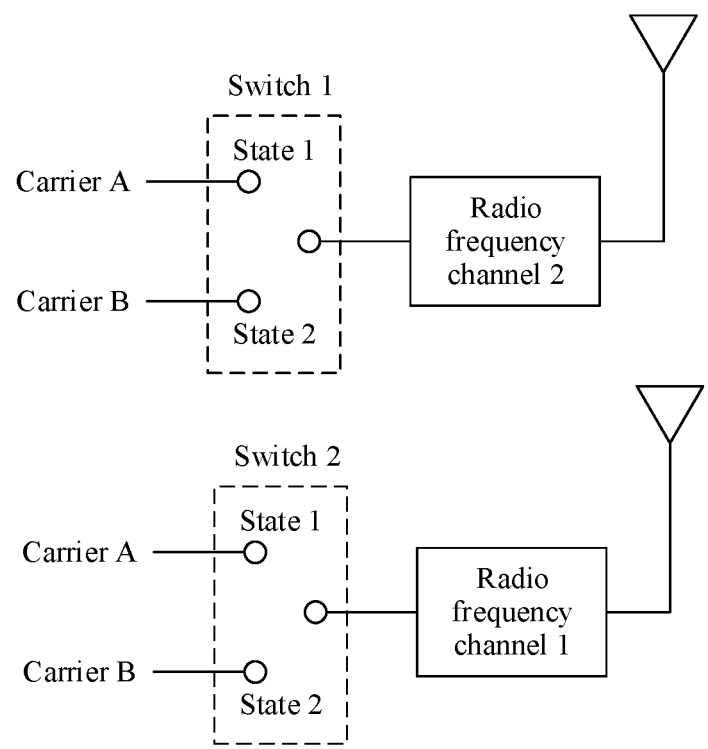
FIG. 7B is a schematic diagram of a radio frequency channel according to an embodiment of this application.

As shown in FIG. 7B, the carrier A and the carrier B share a radio frequency channel 1 and a radio frequency channel 2. When the carrier A works, a switch 1 works in a state 1, and a switch 2 works in a state 1. When the carrier B works, the switch 1 works in a state 2, and the switch 2 works in a state 2. It takes time for the radio frequency channel 1 and the radio frequency channel 2 to be switched between the carrier A and the carrier B. For example, t1 (t1 is duration) is required for switching the radio frequency channel 1 from the carrier A to the carrier B, and t2 (t2 is duration) is required for switching the radio frequency channel 2 from the carrier A to the carrier B. The period of switching from the carrier A to the carrier B may be obtained based on t1 and t2. For example, the period of switching from the carrier A to the carrier B may include one or more of t1, t2, or a larger value or an average value of t1 and t2.

Optionally, in addition to the foregoing explanation of the inter-carrier switching period, the inter-carrier switching period may be other time required for inter-carrier switching. This is not limited in this embodiment of this application.

702. The terminal sends the inter-carrier switching period information to a network device. Correspondingly, the network device receives the inter-carrier switching period information from the terminal.

Information in an existing information element may be redefined, to indicate the inter-carrier switching period information. For example, for one carrier, an information element of an uplink carrier switching period list (for example, "carrier-SwitchingTimesList"), may be added to sequence of an information element of band parameters (for example, "BandParameters"). Sequence in "carrier-Switching-TimesList" includes an information element of an inter-carrier switching period "carrier-SwitchingTimes". Sequence in "carrier-SwitchingTimes" includes an information element of uplink switching period (for example, "switchingTimeUL"), and "switchingTimeUL" is used to indicate a period of switching from the carrier to one or more carriers. For example, information included in "BandParameters" may be:

```
BandParameters::= SEQUENCE {
    carrier-SwitchingTimesList         SEQUENCE (SIZE
(1..maxSimultaneousBands)) OF carrier-SwitchingTimes
    ...
}
carrier-SwitchingTimes ::= SEQUENCE {
    switchingTimeUL ENUMERATED {n0 µs, n30 µs, n100 µs, n140 µs,
n200 µs, n300 µs, n500 µs, n900 µs} OPTIONAL
}
```

After receiving the inter-carrier switching period information, the network device may learn of the inter-carrier switching period. Optionally, FIG. 7A and FIG. 6A (or FIG. 6B) may be combined, and the first capability information in FIG. 6A (or FIG. 6B) and the inter-carrier switching period information may be carried in one message, or may be carried in different messages.

Optionally, the method further includes: The network device sends third indication information to the terminal, where the third indication information is used to indicate the terminal to report the inter-carrier switching period information.

Correspondingly, the terminal receives the third indication information from the network device. The terminal may perform step 702 based on an indication of the third indication information.

The third indication information may be carried in a system message broadcast by the network device, or may be carried in a message (for example, an RRC message) specially sent by the network device to the terminal.

Optionally, the third indication information and the fourth indication information may be carried in a same message, or may be carried in different messages.

Because different terminals have different capabilities, through step 701 and step 702, each terminal can report an inter-carrier switching period based on a capability of the terminal, so that the network device can flexibly schedule a resource based on the switching period reported by each terminal.

Optionally, step 701 and step 702 are optional. The terminal may neither obtain nor send the switching period information to the network device. Instead, the terminal and the network device may preconfigure a switching period between every two carriers in the N carriers or a longest switching period in the N carriers. For example, the 3GPP protocol may specify a value, and a switching period between every two carriers in the N carriers is less than or equal to the value, so that the network device can schedule a resource for the terminal based on the value.

703. The network device schedules data on the carriers based on the inter-carrier switching period information.

The network device may learn of the inter-carrier switching period based on the inter-carrier switching period information, to determine a part of time domain resources. On the part of time domain resources, the network device does not schedule data on each carrier, and the terminal completes inter-carrier switching within duration of the part of time domain resources. For ease of description, the part of time domain resources are referred to as a silent time domain resource below.

Optionally, scheduling data on the carriers herein may include scheduling one or more of SRSs, physical uplink shared channels (physical uplink shared channel, PUSCH), and physical uplink control channels (physical uplink control channel, PUCCH) on the carriers.

Optionally, when the terminal performs uplink transmission on the N carriers in TDM mode, the network device may learn of, by using the inter-carrier switching period information in step 702, the switching period between every two carriers in the N carriers (corresponding to the first case and the second case in step 701) or the switching period between the two carriers with the longest switching period in the N carriers (corresponding to the third case in step 701).

Optionally, after learning of the switching period between every two carriers in the N carriers, the network device may determine a silent time domain resource between two carriers based on the switching period between the two carriers.

Optionally, when the network device learns of the switching period between the two carriers with the longest switching period in the N carriers, the network device may separately determine a silent time domain resource between every two carriers in the N carriers based on the switching period between the two carriers with the longest switching period.

The following uses a silent time domain resource between two carriers (the carrier A and the carrier B) as an example for description. The following content is applicable to any two carriers in the N carriers.

Optionally, the silent time domain resource is a segment of consecutive time domain resources. The silent time domain resource may include an uplink time domain resource, a downlink time domain resource, or a flexible time domain resource of the carrier A or the carrier B.

It may be understood that if the silent time domain resource includes an uplink time domain resource of the carrier A or the carrier B, the network device may not schedule the uplink time domain resource. This may be understood as that the uplink time domain resource is not an uplink transmission time domain resource (for example, the uplink transmission time domain resource may include one or more of an SRS resource, a PUSCH resource, and a PUCCH resource).

A length of the silent time domain resource is greater than or equal to a length of a period of switching between the carrier A and the carrier B.

Optionally, the silent time domain resource is neither an uplink transmission time domain resource of the carrier A nor an uplink transmission time domain resource of the carrier B.

Optionally, the silent time domain resource may be neither configured by the network device as an uplink time domain resource of the carrier A nor configured by the network device as an uplink time domain resource of the carrier B. Alternatively, the silent time domain resource may be configured as an uplink time domain resource of the carrier A, but the network device does not schedule data that is on the carrier A on the uplink time domain resource of the carrier A. Alternatively, the silent time domain resource may be configured as an uplink time domain resource of the carrier B, but the network device does not schedule data that is on the carrier B on the uplink time domain resource of the carrier B.

Optionally, a preceding symbol adjacent to the silent time domain resource is an uplink transmission time domain resource of the carrier A, and a subsequent symbol adjacent to the silent time domain resource is an uplink transmission time domain resource of the carrier B. Alternatively, a preceding symbol adjacent to the silent time domain resource is an uplink transmission time domain resource of the carrier B, and a subsequent symbol adjacent to the silent time domain resource is an uplink transmission time domain resource of the carrier A.

The terminal may perform switching from the carrier A to the carrier B, or perform switching from the carrier B to the carrier A within duration of the silent time domain resource.

Figure 7C:
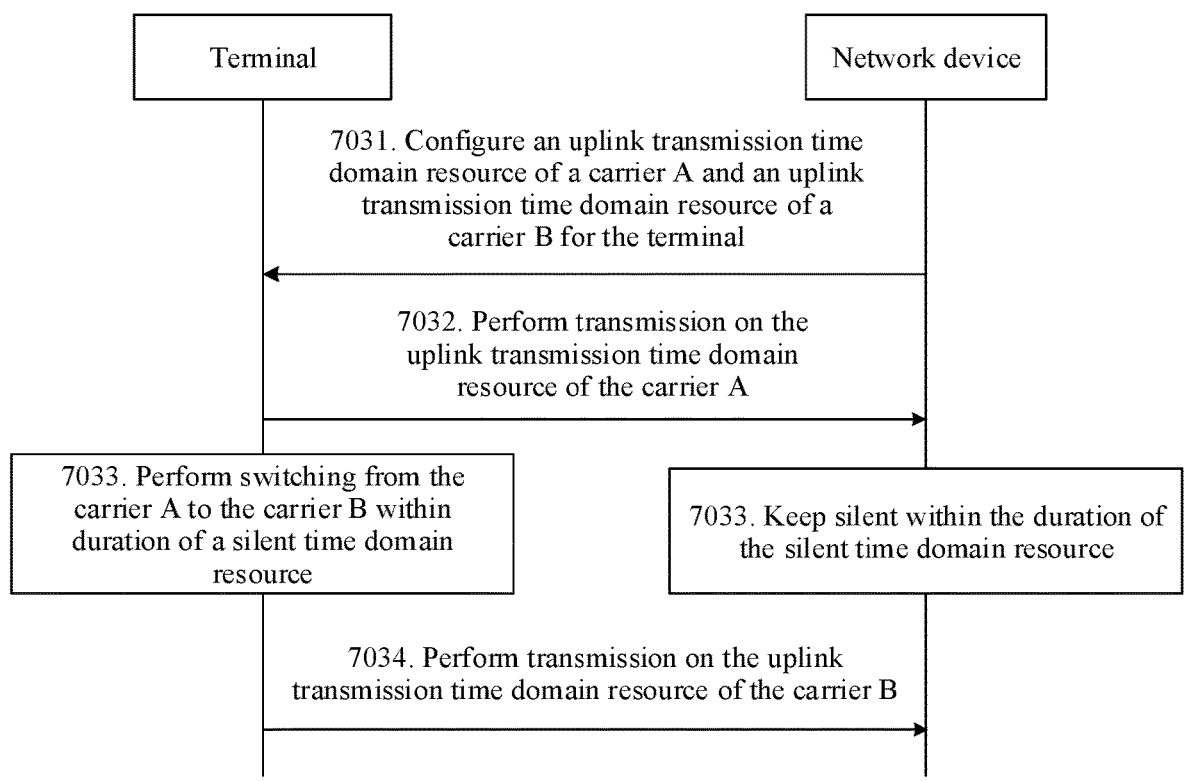
FIG. 7C is a flowchart of a carrier switching method according to an embodiment of this application.

FIG. 7C is a schematic diagram in which the terminal performs carrier switching within duration of the silent time domain resource. An example in which the terminal performs carrier switching from the carrier A to the carrier B is used, and FIG. 7C is also applicable to carrier switching from the carrier B to the carrier A. As shown in FIG. 7C:

7031. The network device configures the uplink transmission time domain resource of the carrier A and the uplink transmission time domain resource of the carrier B for the terminal.

7032. The terminal performs transmission on the uplink transmission time domain resource of the carrier A.

7033. The terminal performs switching from the carrier A to the carrier B within duration of the silent time domain resource.

Correspondingly, the network device keeps silent within duration of the silent time domain resource.

When the terminal determines that neither data on the carrier A nor data on the carrier B is scheduled on a time domain resource, but a preceding symbol of the time domain resource is an uplink transmission time domain resource of the carrier A, and a subsequent symbol of the time domain resource is an uplink transmission time domain resource of the carrier B, the terminal may determine that the time domain resource is a silent time domain resource, and then the terminal performs switching from the carrier A to the carrier B within duration of the silent time domain resource.

In an optional implementation, when the terminal performs switching from the carrier A to the carrier B within duration of the silent time domain resource, the network device does not need to indicate the terminal to perform the switching. The terminal may determine that there is no scheduling on a time domain resource, a preceding symbol adjacent to the time domain resource is a transmission time domain resource of the carrier A, and a subsequent symbol adjacent to the time domain resource is a transmission time domain resource of the carrier B. In this way, the terminal determines that switching needs to be performed.

Figure 7D:
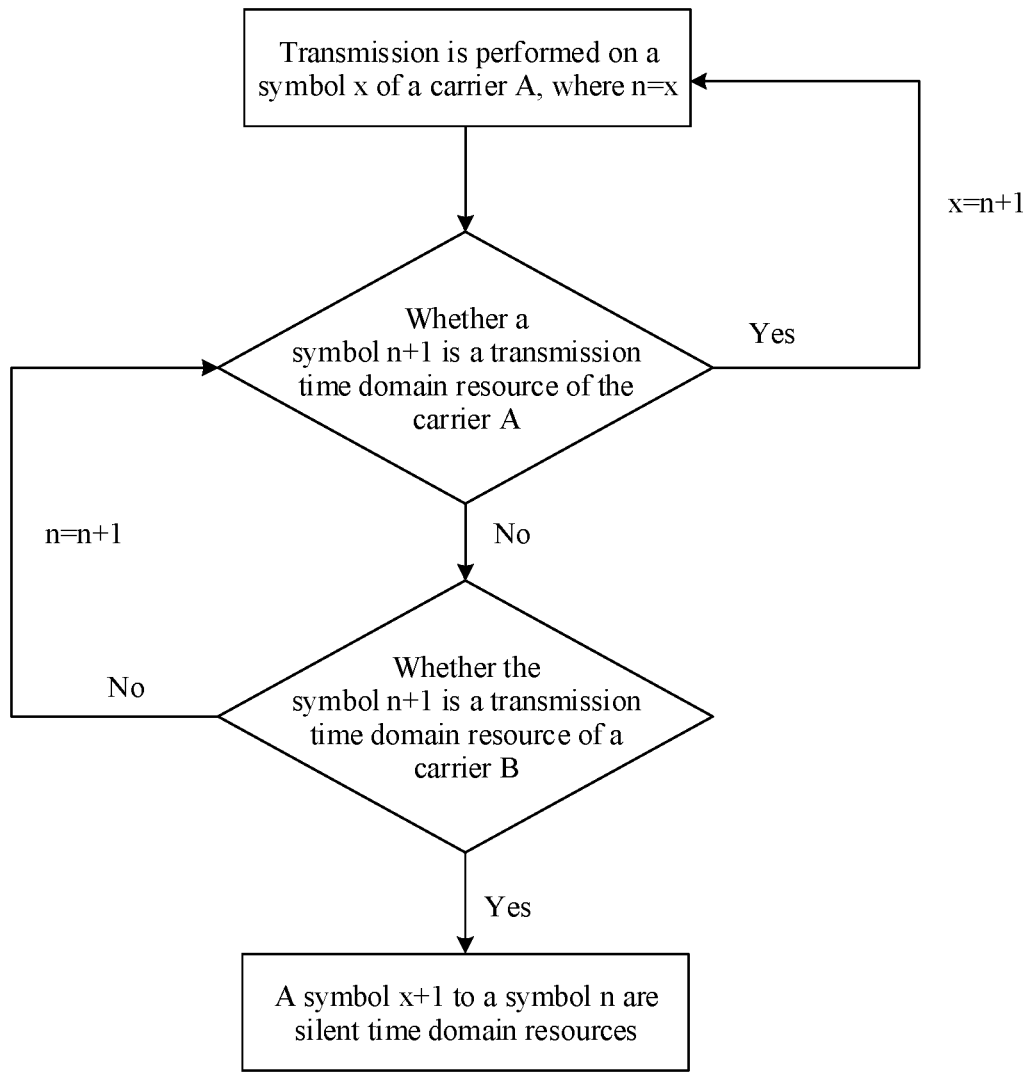
FIG. 7D is a flowchart of a method for determining a silent time domain resource according to an embodiment of this application.

FIG. 7D is a schematic diagram of a method for determining a silent time domain resource. As shown in FIG. 7D:

In a first step, transmission is performed in a symbol x of the carrier A, and a traversal operator n=x is set, where x may be an integer greater than or equal to 1.

In a second step, whether a symbol n+1 is an uplink transmission time domain resource of the carrier A is determined.

When the symbol n+1 is an uplink transmission time domain resource of the carrier A, the first step may be returned to, and x may be reset, so that x=n+1. Then, an action in the first step is performed.

When the symbol n+1 is not an uplink transmission time domain resource of the carrier A, a third step may be performed.

In the third step, whether the symbol n+1 is an uplink transmission time domain resource of the carrier B is determined.

When the symbol n+1 is not an uplink transmission time domain resource of the carrier B, n may be reset, n+1 is assigned to n, and then the second step is performed. For example, in the second step, based on the value of n+1 obtained through reassignment, whether the symbol n+1 is a transmission time domain resource of the carrier A is determined.

In a fourth step, when the symbol n+1 is an uplink transmission time domain resource of the carrier B, it may be determined that time domain resources of a symbol x+1 to the symbol n (including a symbol x+1, a symbol x+2, a symbol x+3, . . . , and the symbol n) are silent time domain resources.

In another optional implementation, the terminal performs switching from the carrier A to the carrier B within duration of the silent time domain resource, and the network device sends indication information to the terminal. The indication information indicates the terminal to perform switching. Specifically, the indication information may indicate the silent time domain resource of the terminal, for example, may indicate locations of the first symbol to the last symbol of the silent time domain resource.

7034. The terminal performs transmission on the uplink transmission time domain resource of the carrier B.

Figures 8, 9, 10:
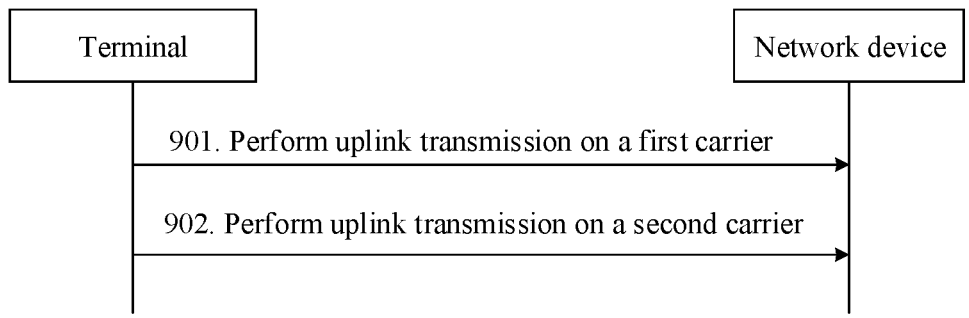

The following provides descriptions with reference to FIG. 8. For example, refer to FIG. 8. In an NR DC scenario, an NR base station 1 uses a carrier 1, where the carrier 1 is a TDD carrier with a subcarrier spacing of 30 kHz; and an NR base station 2 uses a carrier 2, where the carrier 2 is an FDD carrier with a subcarrier spacing of 15 kHz. For slot configurations of the carrier 1 and the carrier 2, refer to FIG. 8. It is assumed that transmission is performed on the carrier 1 on a time domain resource (that is, a slot 4 and a slot 9 corresponding to the carrier 1) on which the carrier 2 overlaps the carrier 1, and transmission is performed on the carrier 2 on a time domain resource on which the carrier 2 does not overlap the carrier 1.

For example, it is assumed that 0 μs is required for the terminal to perform switching from the carrier 2 to the carrier 1. After the network device schedules uplink data of the terminal in an uplink slot 1 corresponding to the carrier 2, because 0 μs is required for the terminal to perform carrier switching, the network device may immediately schedule the uplink data of the terminal in the slot 4 corresponding to the carrier 1.

For another example, it is assumed 30 μs is required for the terminal to perform switching from the carrier 2 to the carrier 1. The last symbol in an uplink slot 1 corresponding to the carrier 2 or the first symbol in the slot 4 corresponding to the carrier 1 may be a silent time domain resource, and the terminal may perform carrier switching within duration of the silent time domain resource. In this case, after the network device schedules the uplink data of the terminal on one or more symbols that include the last symbol and that are in the uplink slot 1 corresponding to the carrier 2, the network device can schedule the uplink data of the terminal only on the second symbol and a symbol after that in the slot 4 corresponding to the carrier 1. After the network device schedules the uplink data of the terminal on one or more symbols except the last symbol in the uplink slot 1 corresponding to the carrier 2, the network device may schedule the uplink data of the terminal on any one or more symbols in the slot 4 corresponding to the carrier 1.

The foregoing descriptions are provided by using an example of switching from the carrier 2 to the carrier 1. Switching from the carrier 1 to the carrier 2 is similar, and details are not described herein again.

According to the communication method provided in this embodiment of this application, the terminal may report the inter-carrier switching period information to the network device, so that the network device can reserve, for the terminal based on the inter-carrier switching period information during scheduling, a period for performing inter-carrier switching, to ensure that the quantity of radio frequency channels used on each carrier does not decrease when the terminal performs uplink transmission in TDM mode.

It can be learned from the foregoing descriptions that the terminal may perform uplink transmission on the N carriers in TDM mode, thereby improving an uplink transmission capability of the terminal. The following describes a specific implementation process of the terminal by using an example in which the N carriers are two carriers (denoted as a first carrier and a second carrier).

An embodiment of this application further provides a communication method. As shown in FIG. 9, the method includes the following steps.

901. A terminal performs uplink transmission on a first carrier.

902. The terminal performs uplink transmission on a second carrier.

When uplink transmission is performed on the first carrier and the second carrier in TDM mode, a quantity of radio frequency channels used on at least one of the carriers is greater than a quantity of radio frequency channels used on the carrier when uplink transmission is performed on the first carrier and the second carrier in simultaneous transmission mode.

Optionally, a quantity of radio frequency channels used on the first carrier when uplink transmission is performed on the first carrier and the second carrier in TDM mode is a first radio frequency channel quantity, a quantity of radio frequency channels used on the first carrier when uplink transmission is performed on the first carrier and the second carrier in simultaneous transmission mode is a second radio frequency channel quantity, and the first radio frequency channel quantity is greater than the second radio frequency channel quantity.

Optionally, a quantity of radio frequency channels used on the second carrier when uplink transmission is performed on the first carrier and the second carrier in TDM mode is a third radio frequency channel quantity, a quantity of radio frequency channels used on the second carrier when uplink transmission is performed on the first carrier and the second carrier in simultaneous transmission mode is a fourth radio frequency channel quantity, and the third radio frequency channel quantity is greater than the fourth radio frequency channel quantity.

Figure 5:
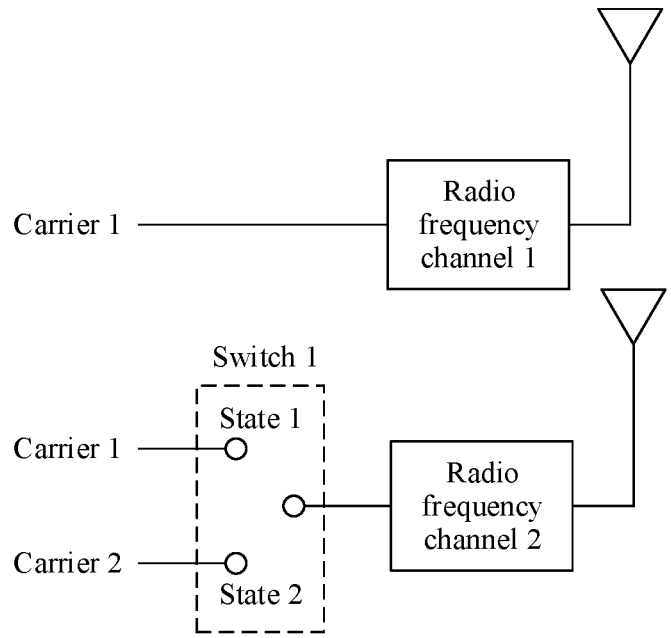
FIG. 5 is a schematic diagram of a radio frequency channel according to an embodiment of this application.

For example, refer to FIG. 5. When uplink transmission is performed on the carrier 1 and the carrier 2 in simultaneous transmission mode, a radio frequency channel used on the carrier 1 may be a radio frequency channel 1, and a radio frequency channel used on the carrier 2 may be a radio frequency channel 2. In this case, quantities of radio frequency channels used on the carrier 1 and the carrier 2 are both 1. When uplink transmission is performed on the carrier 1 and the carrier 2 in TDM mode, radio frequency channels used on the carrier 1 may be a radio frequency channel 1 and a radio frequency channel 2, and a radio frequency channel used on the carrier 2 may be a radio frequency channel 2. In this case, a quantity of radio frequency channels used on the carrier 1 is 2, and a quantity of radio frequency channels used on the carrier 2 is 1. In this case, the quantity of radio frequency channels used on the carrier 1 when uplink transmission is performed on the carrier 1 and the carrier 2 in TDM mode is greater than the quantity of radio frequency channels used on the carrier 1 when uplink transmission is performed on the carrier 1 and the carrier 2 in simultaneous transmission mode, and the quantity of radio frequency channels used on the carrier 2 when uplink transmission is performed on the carrier 1 and the carrier 2 in TDM mode is the same as the quantity of radio frequency channels used on the carrier 2 when uplink transmission is performed on the carrier 1 and the carrier 2 in simultaneous transmission mode.

For example, refer to FIG. 7B. When uplink transmission is performed on the carrier A and the carrier B in simultaneous transmission mode, a radio frequency channel used on the carrier A may be a radio frequency channel 1, and a radio frequency channel used on the carrier B may be a radio frequency channel 2. In this case, quantities of radio frequency channels used on the carrier A and the carrier B are both 1. When uplink transmission is performed on the carrier A and the carrier B in TDM mode, radio frequency channels used on the carrier A may be a radio frequency channel 1 and a radio frequency channel 2, and radio frequency channels used on the carrier B may be a radio frequency channel 1 and a radio frequency channel 2. In this case, a quantity of radio frequency channels used on the carrier A is 2, and a quantity of radio frequency channels used on the carrier B is 2. In this case, the quantity of radio frequency channels used on the carrier A when uplink transmission is performed on the carrier A and the carrier B in TDM mode is greater than the quantity of radio frequency channels used on the carrier A when uplink transmission is performed on the carrier A and the carrier B in simultaneous transmission mode, and the quantity of radio frequency channels used on the carrier B when uplink transmission is performed on the carrier A and the carrier B in TDM mode is greater than the quantity of radio frequency channels used on the carrier B when uplink transmission is performed on the carrier A and the carrier B in simultaneous transmission mode.

Correspondingly, in step 901 and step 902, the network device performs uplink receiving on the first carrier and the second carrier.

In a DC scenario, the network device is a primary network device or a secondary network device.

According to the method provided in this embodiment of this application, the terminal may perform uplink transmission on N carriers in TDM mode, and a first radio frequency channel quantity supported on at least one carrier in the N carriers is greater than a supported second radio frequency channel quantity, thereby improving an uplink transmission capability of the terminal.

The foregoing describes, with reference to FIG. 6A and FIG. 6B, how to determine a radio frequency channel capability of a carrier in TDM mode, describes, with reference to FIG. 7A to FIG. 8, how to perform inter-carrier switching, and describes, with reference to FIG. 9, uplink transmission performed by the terminal on a plurality of carriers in TDM mode. It should be noted that the foregoing three solutions may be randomly combined, and any combination of the foregoing three solutions may be combined with the following solution of configuring a TDM time domain resource.

In the foregoing embodiments of this application, when the terminal performs uplink transmission on a plurality of carriers in TDM mode, (for example, the solution shown in FIG. 9 or step 606 in FIG. 6B), the network device may ensure, in the following manner (1), manner (2), or manner (3), that the terminal performs uplink transmission on the plurality of carriers in TDM mode.

Manner (1): The network device ensures that uplink time domain resources configured for the plurality of carriers do not overlap. In this case, the plurality of carriers may all be TDD carriers.

In the DC scenario, during specific implementation of the manner (1), a primary network device and a secondary network device may determine, through negotiation, a time domain resource configuration of each carrier of the terminal, to ensure that uplink time domain resources of different carriers do not overlap. If both the primary network device and the secondary network device are NR base stations, the primary network device and the secondary network device may negotiate through an Xn interface. If one of the primary network device and the secondary network device is an LTE base station, and the other is an NR base station, the primary network device and the secondary network device may negotiate through an X2 interface.

In a CA scenario, the network device may independently determine a time domain resource configuration of each carrier of the terminal, to ensure that uplink time domain resources of different carriers do not overlap.

For example, for time domain resources configured by the network device for the carrier 1 and the carrier 2 of the terminal, refer to FIG. 10. Both the carrier 1 and the carrier 2 are TDD carriers, a subcarrier spacing of the carrier 1 is 30 kHz, a subcarrier spacing of the carrier 2 is 15 kHz, and the uplink time domain resources of the carrier 1 and the carrier 2 do not overlap.

Manner (2): The network device ensures that time domain resources that can be used for uplink transmission in the uplink time domain resources configured for the plurality of carriers do not overlap.

In this case, any one of the plurality of carriers may be a TDD carrier, or may be an FDD carrier.

It should be noted that although the network device configures an uplink time domain resource for a carrier, whether the terminal can perform uplink transmission on the uplink time domain resource of the carrier depends on a configuration of the network device. For example, the network device configures 10 uplink slots for the terminal, where six uplink slots can be used for uplink transmission, and the remaining four uplink slots cannot be used for uplink transmission.

During specific implementation, the manner (2) may be implemented by configuring a TDM pattern. In this case, the network device may configure, by using an information element of TDM pattern configuration (for example, "tdmPatternConfig") in RRC signaling, a time domain resource that can be used for uplink transmission in uplink time domain resources of one or more of the plurality of carriers.

The manner (2) may be specifically implemented in the following manner (2-1) or manner (2-2).

Manner (2-1): The network device indicates, based on a fixed pattern negotiated with the terminal, the time domain resource that can be used for uplink transmission in the uplink time domain resources of the plurality of carriers of the terminal.

For example, for the fixed pattern, refer to Table 1. In Table 1, U indicates that uplink transmission can be performed, and other symbols indicate that uplink transmission cannot be performed.

TABLE 1

| Index | Slot number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Based on the fixed pattern shown in Table 1, the network device may configure an entry in the pattern for the carrier 1 of the terminal. When all slots that are in slots corresponding to the carrier 1 and that have a same slot number as a slot in the entry are uplink slots, it indicates that the terminal can perform uplink transmission in the slots corresponding to carrier 1; otherwise, it indicates that the terminal cannot perform uplink transmission in the slots. For example, refer to FIG. 8. If the network device configures an entry 0 in the pattern for the carrier 1, it indicates that a slot 2, a slot 3, the slot 4, a slot 7, a slot 8, and the slot 9 in the 10 slots may be used to perform uplink transmission. Because only the slot 4 and the slot 9 corresponding to the carrier 1 are uplink slots, the terminal can perform uplink transmission only in the slot 4 and the slot 9. For the carrier 2, the terminal may perform uplink transmission by default on an uplink time domain resource that does not overlap a time domain resource that can be used for uplink transmission in the uplink time domain resource of the carrier 1. For example, refer to FIG. 8. On the carrier 1, the terminal can perform uplink transmission only in the slot 4 and the slot 9. In this case, on the carrier 2, the terminal may perform uplink transmission in a slot 0, the slot 1, and a slot 3.

Manner (2-2): The network device directly and flexibly configures, by using RRC signaling, whether uplink transmission is allowed in each slot corresponding to each carrier.

For example, refer to FIG. 8. For information configured by the network device for the carrier 1, refer to Table 2, and for information configured by the network device for the carrier 2, refer to Table 3. 1 indicates that uplink transmission can be performed in an uplink slot, and 0 indicates that uplink transmission cannot be performed in an uplink slot. In this case, on the carrier 1, the terminal can perform uplink transmission only in the slot 4 and the slot 9, and on the carrier 2, the terminal can perform uplink transmission in a slot 0, the slot 1, and a slot 3.

TABLE 2

| Slot number | 0 | 1 | 2 | 3 | 4 | 5 | 6 | 7 | 8 | 9 |
|---|---|---|---|---|---|---|---|---|---|---|
| Uplink transmission indication | 0 | 0 | 0 | 0 | 1 | 0 | 0 | 0 | 0 | 1 |

TABLE 3

| Slot number | 0 | 1 | 2 | 3 | 4 |
|---|---|---|---|---|---|
| Uplink transmission indication | 1 | 1 | 0 | 1 | 0 |

In the DC scenario, during specific implementation of manner (2), a primary network device and a secondary network device may determine, through negotiation, uplink time domain resources that can be used to perform uplink transmission in uplink time domain resources of each carrier of the terminal, to ensure that uplink time domain resources that can be used to perform uplink transmission in uplink time domain resources of different carriers do not overlap. If both the primary network device and the secondary network device are NR base stations, the primary network device and the secondary network device may negotiate through an Xn interface. If one of the primary network device and the secondary network device is an LTE base station, and the other is an NR base station, the primary network device and the secondary network device may negotiate through an X2 interface.

In a CA scenario, the network device may independently determine uplink time domain resources that can be used to perform uplink transmission in uplink time domain resources of each carrier of the terminal, to ensure that uplink time domain resources that can be used to perform uplink transmission in uplink time domain resources of different carriers do not overlap.

For overlapping uplink time domain resources of different carriers, the network device may determine uplink throughputs and/or blocking rates of the different carriers, and the overlapping uplink time domain resources can be used to perform uplink transmission on a carrier with a higher uplink throughput and/or a lower blocking rate.

Manner (3): The network device performs scheduling, so that the terminal performs uplink transmission on the N carriers in TDM mode.

In this case, any one of the plurality of carriers may be a TDD carrier, or may be an FDD carrier.

The network device may ensure, by performing scheduling, that time domain resources used when the terminal performs uplink transmission on different carriers do not overlap, that is, ensure that no simultaneous transmission is performed on different carriers. For example, refer to FIG. 4A. The network device may schedule uplink data of the terminal in the slot 3 corresponding to the 2.6 G carrier, and schedule the uplink data of the terminal in the slot 9 corresponding to the 3.5 G carrier. In the first half slot of the slot 2 corresponding to the 2.6 G carrier (that is, the slot 4 corresponding to the 3.5 G carrier), the terminal schedules the uplink data of the terminal on the 2.6 G carrier or the 3.5 G carrier.

Scheduling herein may include scheduling of one or more of an SRS, a PUSCH, and a PUCCH on a carrier.

Optionally, in the manner (3), for a terminal that supports uplink transmission in TDM mode, the network device may explicitly indicate, to the terminal, whether to perform uplink transmission in TDM mode. For example, the network device may add a parameter of single-transmission capability (for example, "singleUL-capability") to sequence in an information element of cell group configuration (for example, "CellGroupConfig") in RRC signaling or RRC reconfiguration (Reconfiguration) signaling. If this parameter is set to true (true), this parameter indicates that the terminal performs uplink transmission in TDM mode; otherwise, this parameter indicates that the terminal does not perform uplink transmission in TDM mode. In this case, information included in "CellGroupConfig" may be:

```
CellGroupConfig ::=          SEQUENCE {
    ...
    singleUL-capability      ENUMERATED {true}
    ...
}
```

Optionally, the method further includes: The terminal performs uplink transmission on a third carrier, where uplink transmission is performed on the third carrier and the first carrier or the second carrier in simultaneous transmission mode within a first time range. The first time range may be any time range. This is not specifically limited in this embodiment of this application.

Optionally, the method in FIG. 9 may be combined with the method in FIG. 7A. In FIG. 9, the terminal may further report information about a switching period between the first carrier and the second carrier, and the network device may schedule uplink data that is on the first carrier and the second carrier based on the information about the switching period between the first carrier and the second carrier, to ensure that the terminal has sufficient time to perform carrier switching between the first carrier and the second carrier.

Optionally, the method in FIG. 9 may be combined with the method in FIG. 6B. Specifically, the method shown in FIG. 9 may be an example of step 606 in FIG. 6B.

It should be noted that different carriers in the foregoing embodiments may be asynchronous, that is, start symbols of slots corresponding to different carriers are not aligned. For example, refer to FIG. 11, start symbols of slots corresponding to a carrier 1, a carrier 2, and a carrier 3 are not aligned, and start symbols of slots corresponding to the carrier 3 and a carrier 4 are aligned.

In this case, the terminal may measure a system frame number and frame timing difference (SFTD, where the SFTD refers to an information element "SFN and frame timing difference" in section 5.1.14 in 3GPP TS 38.215 V15.4.0, and SFN refers to a system frame number (system frame number)) and uplink timing advance (timing advance, TA) information, and send the SFTD and the uplink TA information to the network device. The network device may obtain, based on the SFTD and/or the uplink TA information reported by the terminal, a time difference between slots corresponding to different carriers. In this case, if uplink time domain resources of a plurality of carriers overlap, when the terminal performs uplink transmission on only one carrier, the network device needs to perform symbol-level scheduling avoidance on the other carriers, to prevent the terminal from performing simultaneous transmission on the overlapping uplink time domain resources of the plurality of carriers.

The solutions in the foregoing embodiments of this application may be combined on a premise that there is no contradiction.

The foregoing mainly describes the solutions in the embodiments of this application from a perspective of interaction between the network elements. It may be understood that to implement the foregoing functions, the network elements, for example, the network device and the terminal, include at least one of corresponding hardware structures and software modules for implementing the functions. A person skilled in the art should easily be aware that, in combination with units and algorithm steps of the examples described in the embodiments disclosed in this specification, this application may be implemented by hardware or a combination of hardware and computer software. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example, and is merely logical function division. During actual implementation, another division manner may be used.

When an integrated unit is used, FIG. 12 is a possible schematic diagram of a structure of a communication apparatus (denoted as a communication apparatus 120) in the foregoing embodiments. The communication apparatus 120 includes a processing unit 1201 and a communication unit 1202, and may further include a storage unit 1203. The schematic diagram of the structure shown in FIG. 12 may be used to illustrate structures of the network device and the terminal in the foregoing embodiments.

When the schematic diagram of the structure shown in FIG. 12 is used to illustrate the structure of the terminal in the foregoing embodiments, the processing unit 1201 is configured to control and manage an action of the terminal. For example, the processing unit 1201 is configured to perform, by using the communication unit 1202, steps 601 and 602 in FIG. 6A, steps 601, 602, and 604 to 606 in FIG. 6B, steps 701 and 702 in FIG. 7A, steps 7031 to 7034 in FIG. 7C (where step 7033 is step 7033 performed by the terminal in FIG. 7C), the steps in FIG. 7D, steps 901 and 902 in FIG. 9, and/or an action performed by the terminal in another process described in the embodiments of this application. The processing unit 1201 may communicate with another network entity by using the communication unit 1202, for example, communicate with the network device shown in FIG. 6A. The storage unit 1203 is configured to store program code and data of the terminal.

When the schematic diagram of the structure shown in FIG. 12 is used to illustrate the structure of the terminal in the foregoing embodiments, the communication apparatus 120 may be a terminal, or may be a chip in the terminal.

When the schematic diagram of the structure shown in FIG. 12 is used to illustrate the structure of the network device in the foregoing embodiments, the processing unit 1201 is configured to control and manage an action of the network device. For example, the processing unit 1201 is configured to perform, by using the communication unit 1202, steps 602 and 603 in FIG. 6A, steps 602 to 605 in FIG. 6B, steps 702 and 703 in FIG. 7A, steps 7031 to 7034 in FIG. 7C (where step 7033 is step 7033 performed by the network device in FIG. 7C), the steps in FIG. 7D, steps 901 and 902 in FIG. 9, and/or an action performed by the network device in another process described in the embodiments of this application. The processing unit 1201 may communicate with another network entity by using the communication unit 1202, for example, communicate with the terminal shown in FIG. 6A. The storage unit 1203 is configured to store program code and data of the network device.

When the schematic diagram of the structure shown in FIG. 12 is used to illustrate the structure of the network device in the foregoing embodiments, the communication apparatus 120 may be a network device, or may be a chip in the network device.

When the communication apparatus 120 is the terminal or the network device, the processing unit 1201 may be a processor or a controller, and the communication unit 1202 may be a communication interface, a transceiver, a transceiver machine, a transceiver circuit, a transceiver apparatus, or the like. The communication interface is a generic term, and may include one or more interfaces. The storage unit 1203 may be a memory. When the communication apparatus 120 is the chip in the terminal or the network device, the processing unit 1201 may be a processor or a controller, and the communication unit 1202 may be an input/output interface, a pin, a circuit, or the like. The storage unit 1203 may be a storage unit (for example, a register or a cache) in the chip, or may be a storage unit (for example, a read-only memory (read-only memory, ROM) or a random access memory (random access memory, RAM for short)) outside the chip and in the terminal or the network device.

The communication unit may also be referred to as a transceiver unit. An antenna and a control circuit having transceiver functions in the communication apparatus 120 may be considered as the communication unit 1202 in the communication apparatus 120, and a processor having a processing function may be considered as the processing unit 1201 in the communication apparatus 120. Optionally, a component configured to implement a receiving function in the communication unit 1202 may be considered as a receiving unit. The receiving unit is configured to perform a receiving step in the embodiments of this application. The receiving unit may be a receiver machine, a receiver, a receiver circuit, or the like. A component configured to implement a sending function in the communication unit 1202 may be considered as a sending unit. The sending unit is configured to perform a sending step in the embodiments of this application. The sending unit may be a transmitter machine, a transmitter, a transmitter circuit, or the like.

When the integrated unit in FIG. 12 is implemented in a form of a software functional module and sold or used as an independent product, the integrated unit may be stored in a computer-readable storage medium. Based on such an understanding, the technical solutions in the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium storing the computer software product includes any medium that can store program code, such as a USB flash drive, a removable hard disk, a read-only memory, a random access memory, a magnetic disk, or an optical disc.

The unit in FIG. 12 may alternatively be referred to as a module. For example, the processing unit may be referred to as a processing module.

Figure 14:
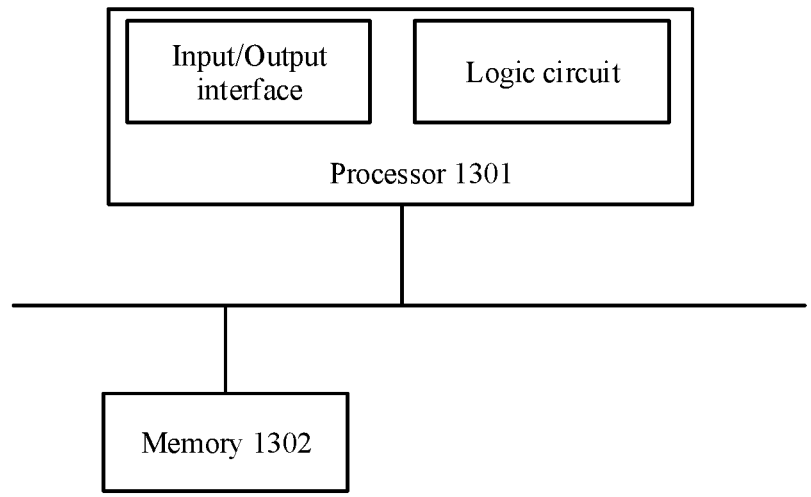

An embodiment of this application further provides a schematic diagram of a hardware structure of a communication apparatus. Refer to FIG. 13 or FIG. 14. The communication apparatus includes a processor 1301, and optionally, further includes a memory 1302 connected to the processor 1301.

In a first possible implementation, refer to FIG. 13. The communication apparatus further includes a transceiver 1303. The processor 1301, the memory 1302, and the transceiver 1303 are connected by using a bus. The transceiver 1303 is configured to communicate with another device or a communication network. Optionally, the transceiver 1303 may include a transmitter and a receiver. A component configured to implement a receiving function in the transceiver 1303 may be considered as a receiver. The receiver is configured to perform a receiving step in the embodiments of this application. A component configured to implement a sending function in the transceiver 1303 may be considered as a transmitter. The transmitter is configured to perform a sending step in the embodiments of this application.

Based on the first possible implementation, the schematic diagram of the structure shown in FIG. 13 may be used to illustrate a structure of the network device or the terminal in the foregoing embodiments.

When the schematic diagram of the structure shown in FIG. 13 is used to illustrate the structure of the terminal in the foregoing embodiments, the processor 1301 is configured to control and manage an action of the terminal. For example, the processor 1301 is configured to support the terminal in performing steps 601 and 602 in FIG. 6A, steps 601, 602, and 604 to 606 in FIG. 6B, steps 701 and 702 in FIG. 7A, steps 7031 to 7034 in FIG. 7C (where step 7033 is step 7033 performed by the terminal in FIG. 7C), the steps in FIG. 7D, steps 901 and 902 in FIG. 9, and/or an action performed by the terminal in another process described in the embodiments of this application. The processor 1301 may communicate with another network entity by using the transceiver 1303, for example, communicate with the network device shown in FIG. 6A. The memory 1302 is configured to store program code and data of the terminal.

When the schematic diagram of the structure shown in FIG. 13 is used to illustrate the structure of the network device in the foregoing embodiments, the processor 1301 is configured to control and manage an action of the network device. For example, the processor 1301 is configured to support the network device in performing steps 602 and 603 in FIG. 6A, steps 602 to 605 in FIG. 6B, steps 702 and 703 in FIG. 7A, steps 7031 to 7034 in FIG. 7C (where step 7033 is step 7033 performed by the network device in FIG. 7C), the steps in FIG. 7D, steps 901 and 902 in FIG. 9, and/or an action performed by the network device in another process described in the embodiments of this application. The processor 1301 may communicate with another network entity through the transceiver 1303, for example, communicate with the terminal shown in FIG. 6A. The memory 1302 is configured to store program code and data of the network device.

In a second possible implementation, the processor 1301 includes a logic circuit and at least one of an input interface and an output interface. The output interface is configured to perform a sending action in a corresponding method, and the input interface is configured to perform a receiving action in a corresponding method.

Based on the second possible implementation, the schematic diagram of the structure shown in FIG. 14 may be used to illustrate a structure of the network device or the terminal in the foregoing embodiments.

When the schematic diagram of the structure shown in FIG. 14 is used to illustrate the structure of the terminal in the foregoing embodiments, the processor 1301 is configured to control and manage an action of the terminal. For example, the processor 1301 is configured to support the terminal in performing steps 601 and 602 in FIG. 6A, steps 601, 602, and 604 to 606 in FIG. 6B, steps 701 and 702 in FIG. 7A, steps 7031 to 7034 in FIG. 7C (where step 7033 is step 7033 performed by the terminal in FIG. 7C), the steps in FIG. 7D, steps 901 and 902 in FIG. 9, and/or an action performed by the terminal in another process described in the embodiments of this application. The processor 1301 may communicate with another network entity through at least one of the input interface and the output interface, for example, communicate with the network device shown in FIG. 6A. The memory 1302 is configured to store program code and data of the terminal.

When the schematic diagram of the structure shown in FIG. 14 is used to illustrate the structure of the network device in the foregoing embodiments, the processor 1301 is configured to control and manage an action of the network device. For example, the processor 1301 is configured to support the network device in performing steps 602 and 603 in FIG. 6A, steps 602 to 605 in FIG. 6B, steps 702 and 703 in FIG. 7A, steps 7031 to 7034 in FIG. 7C (where step 7033 is step 7033 performed by the network device in FIG. 7C), the steps in FIG. 7D, steps 901 and 902 in FIG. 9, and/or an action performed by the network device in another process described in the embodiments of this application. The processor 1301 may communicate with another network entity through at least one of the input interface and the output interface, for example, communicate with the terminal shown in FIG. 6A. The memory 1302 is configured to store program code and data of the network device.

FIG. 13 and FIG. 14 each may alternatively show a system chip in the network device. In this case, an action performed by the network device may be implemented by the system chip. For a specific action performed, refer to the foregoing descriptions. Details are not described herein again. FIG. 13 and FIG. 14 each may alternatively show a system chip in the terminal. In this case, an action performed by the terminal may be implemented by the system chip. For a specific action performed, refer to the foregoing descriptions. Details are not described herein again.

In addition, the embodiments of this application further provide schematic diagrams of hardware structures of a terminal (denoted as a terminal 150) and a network device (denoted as a network device 160). For details, refer to FIG. 15 and FIG. 16.

Figure 15:
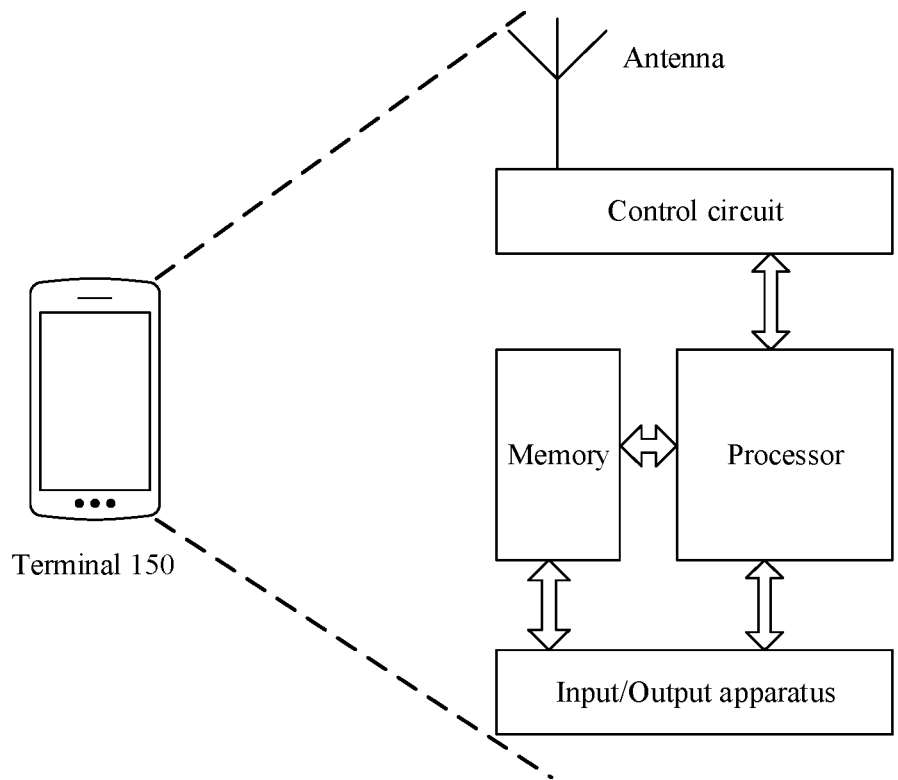
FIG. 15 is a schematic diagram of a hardware structure of a terminal according to an embodiment of is this application.

FIG. 15 is a schematic diagram of the hardware structure of the terminal 150. For ease of description, FIG. 15 shows only main components of the terminal. As shown in FIG. 15, the terminal 150 includes a processor, a memory, a control circuit, an antenna, and an input/output apparatus.

The processor is mainly configured to: process a communication protocol and communication data, control the entire terminal, execute a software program, and process data of the software program. For example, the processor is configured to control the terminal to perform steps 601 and 602 in FIG. 6A, steps 601, 602, and 604 to 606 in FIG. 6B, steps 701 and 702 in FIG. 7A, steps 7031 to 7034 in FIG. 7C (where step 7033 is step 7033 performed by the terminal in FIG. 7C), the steps in FIG. 7D, steps 901 and 902 in FIG. 9, and/or an action performed by the terminal in another process described in the embodiments of this application. The memory is mainly configured to store the software program and the data. The control circuit (which may also be referred to as a radio frequency circuit) is mainly configured to: perform conversion between a baseband signal and a radio frequency signal, and process the radio frequency signal. The control circuit and the antenna may also be collectively referred to as a transceiver that is mainly configured to receive and transmit a radio frequency signal in an electromagnetic wave form. The input/output apparatus, such as a touchscreen, a display, or a keyboard, is mainly configured to receive data entered by a user and output data to the user.

After the terminal is powered on, the processor can read the software program in the memory, interpret and execute instructions of the software program, and process the data of the software program. When data needs to be sent by using the antenna, after performing baseband processing on the to-be-sent data, the processor outputs a baseband signal to a control circuit in a radio frequency circuit. After performing radio frequency processing on the baseband signal, the control circuit sends a radio frequency signal to the outside through the antenna in a form of an electromagnetic wave. When data is sent to the terminal, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 15 shows only one memory and one processor. Actually, the terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. Functions of the baseband processor and the central processing unit are integrated into the processor in FIG. 15. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 16:
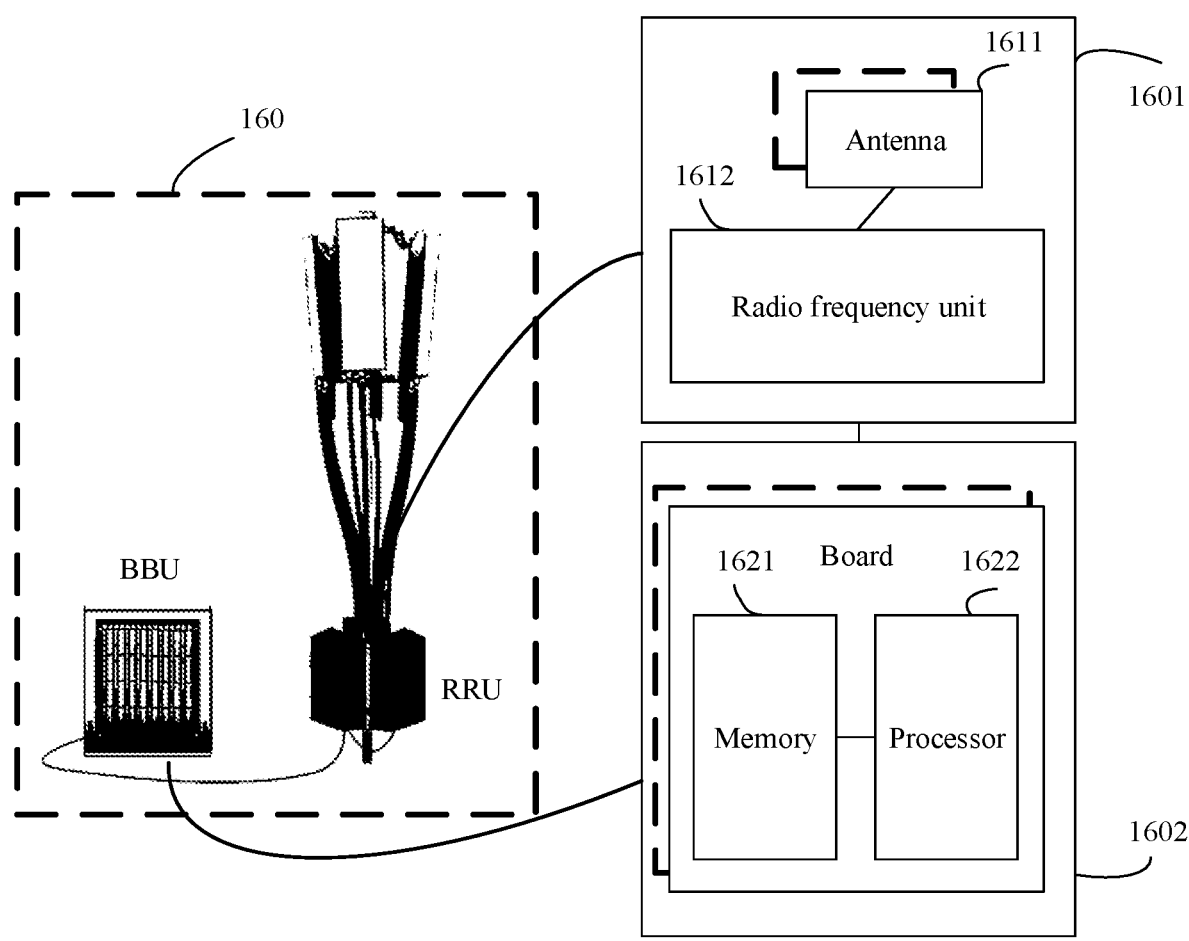
FIG. 16 is a schematic diagram of a hardware structure of a network device according to an embodiment of this application.

FIG. 16 is a schematic diagram of the hardware structure of the network device 160. The network device 160 may include one or more radio frequency units, such as a remote radio unit (remote radio unit, RRU for short) 1601, and one or more baseband units (baseband unit, BBU for short) (which may also be referred to as digital units (digital unit, DU for short)) 1602.

The RRU 1601 may be referred to as a transceiver unit, a transceiver machine, a transceiver circuit, a transceiver, or the like, and may include at least one antenna 1611 and a radio frequency unit 1612. The RRU 1601 is mainly configured to: send and receive a radio frequency signal and perform conversion between a radio frequency signal and a baseband signal. The RRU 1601 and the BBU 1602 may be physically disposed together, or may be physically disposed separately, for example, a distributed base station.

The BBU 1602 is a control center of the network device, may be referred to as a processing unit, and is mainly configured to complete baseband processing functions such as channel coding, multiplexing, modulation, and spectrum spreading.

In an embodiment, the BBU 1602 may include one or more boards. A plurality of boards may jointly support a radio access network (such as an LTE network) of a single RAT, or may separately support radio access networks (such as an LTE network, a 5G network, or another network) of different RATs. The BBU 1602 further includes a memory 1621 and a processor 1622. The memory 1621 is configured to store necessary instructions and data. The processor 1622 is configured to control the network device to perform a necessary action. The memory 1621 and the processor 1622 may serve the one or more boards. In other words, a memory and a processor may be independently disposed on each board. Alternatively, a plurality of boards may share a same memory and a same processor. In addition, a necessary circuit may be further disposed on each board.

It should be understood that the network device 160 shown in FIG. 16 can perform steps 602 and 603 in FIG. 6A, steps 602 to 605 in FIG. 6B, steps 702 and 703 in FIG. 7A, steps 7031 to 7034 in FIG. 7C (where step 7033 is step 7033 performed by the network device in FIG. 7C), the steps in FIG. 7D, steps 901 and 902 in FIG. 9, and/or an action performed by the network device in another process described in the embodiments of this application. Operations, functions, or operations and functions of modules in the network device 160 are separately set to implement corresponding procedures performed in the method embodiments. For details, refer to the descriptions in the foregoing method embodiments. To avoid repetition, detailed descriptions are properly omitted herein.

In an implementation process, the steps of the methods provided in the embodiments may be performed by using a hardware integrated logic circuit in the processor or by using instructions in a form of software. The steps of the methods disclosed with reference to the embodiments of this application may be directly performed and accomplished by using a hardware processor, or may be performed and accomplished by using a combination of hardware and software modules in the processor.

The processor in this application may include but is not limited to at least one of the following computing devices that run software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing a software instruction. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing a software instruction, the processor may further include a necessary hardware accelerator, for example, a field programmable gate array (field programmable gate array, FPGA), a PLD (programmable logic device), or a logic circuit that implements a dedicated logic operation.

The memory in the embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

An embodiment of this application further provides a chip. The chip includes a processor and an interface circuit. The interface circuit is coupled to the processor. The processor is configured to run a computer program or instructions, to implement the foregoing method. The interface circuit is configured to communicate with another module outside the chip.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, this specification and the accompanying drawings are merely descriptions of examples of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:
1. A communication method, comprising:
obtaining first capability information, wherein the first capability information indicates a quantity of multiple-input multiple-output (MIMO) layers supported on a first carrier and a quantity of MIMO layers supported on a second carrier when uplink transmission is performed on the first carrier and the second carrier in time division multiplexing mode;
obtaining inter-carrier switching period information, wherein the inter-carrier switching period information indicates a carrier switching period between the first carrier and the second carrier;
sending the first capability information and the inter-carrier switching period information to a network device; and
receiving indication information from the network device, wherein the indication information indicates performing uplink transmission on the first carrier and the second carrier in the time division multiplexing mode.

2. The method according to claim 1, wherein a message carrying the first capability information further carries second capability information, wherein the second capability information indicates a quantity of MIMO layers supported on the first carrier and a quantity of MIMO layers supported on the second carrier when uplink transmission is performed on the first carrier and the second carrier in simultaneous transmission mode.

3. The method according to claim 1, wherein
the indication information further indicates a quantity of MIMO layers used on the first carrier and a quantity of MIMO layers used on the second carrier when uplink transmission is performed on the first carrier and the second carrier in the time division multiplexing mode, and wherein
when uplink transmission is performed on the first carrier and the second carrier in the time division multiplexing mode, the quantity of MIMO layers used on the first carrier is less than or equal to the quantity of MIMO layers supported on the first carrier, and the quantity of MIMO layers used on the second carrier is less than or equal to the quantity of MIMO layers supported on the second carrier.

4. The method according to claim 1, wherein data is scheduled on the first carrier and the second carrier for uplink transmission in the time division multiplexing mode.

5. The method according to claim 1, wherein the first carrier and the second carrier are carriers between a terminal and the network device.

6. The method according to claim 1, wherein the first carrier and the second carrier are carriers in a carrier aggregation (CA) scenario or dual connectivity (DC) scenario.

7. The method according to claim 1, wherein the method further comprises:
receiving information from the network device indicating reporting the first capability information.

8. A communication apparatus for a terminal, comprising:
at least one processor; and
a memory coupled to the at least one processor and storing executable instructions that, when executed by the at least one processor, cause the terminal to:
obtain first capability information, wherein the first capability information indicates a quantity of multiple-input multiple-output, MIMO, layers supported on a first carrier and a quantity of MIMO layers supported on a second carrier when uplink transmission is performed on the first carrier and the second carrier in time division multiplexing mode;
obtain inter-carrier switching period information, wherein the inter-carrier switching period information indicates carrier a switching period between the first carrier and the second carrier; and
send the first capability information and the inter-carrier switching period information to a network device; and
receive indication information from the network device, wherein the indication information indicates performing uplink transmission on the first carrier and the second carrier in the time division multiplexing mode.

9. The apparatus according to claim 8, wherein a message carrying the first capability information further carries second capability information, wherein the second capability information indicates a quantity of MIMO layers supported on the first carrier and a quantity of MIMO layers supported on the second carrier when uplink transmission is performed on the first carrier and the second carrier in simultaneous transmission mode.

10. The apparatus according to claim 8, wherein
the indication information further indicates a quantity of MIMO layers used on the first carrier and a quantity of MIMO layers used on the second carrier when uplink transmission is performed on the first carrier and the second carrier in the time division multiplexing mode, and wherein when uplink transmission is performed on the first carrier and the second carrier in the time division multiplexing mode, the quantity of MIMO layers used on the first carrier is less than or equal to the quantity of MIMO layers supported on the first carrier, and the quantity of MIMO layers used on the second carrier is less than or equal to the quantity of MIMO layers supported on the second carrier.

11. The apparatus according to claim 8, wherein data is scheduled on the first carrier and the second carrier for uplink transmission in the time division multiplexing mode.

12. The apparatus according to claim 8, wherein the first carrier and the second carrier are carriers between the terminal and the network device.

13. The apparatus according to claim 8, wherein the first carrier and the second carrier are carriers in a carrier aggregation (CA) scenario or dual connectivity (DC) scenario.

14. The apparatus according to claim 8, wherein the instructions that, when executed by the at least one processor, further cause the terminal to:
receive information from the network device indicating reporting the first capability information.

15. A communication apparatus for a network device, comprising:
at least one processor; and
a memory coupled to the at least one processor and storing executable instructions that, when executed by the at least one processor, cause the network device to:
receive first capability information and inter-carrier switching period information from a terminal, wherein the first capability information indicates a quantity of multiple-input multiple-output, MIMO, layers supported on a first carrier and a quantity of MIMO layers supported on a second carrier when uplink transmission is performed on the first carrier and the second carrier in time division multiplexing mode, the inter-carrier switching period information indicates a carrier switching period between the first carrier and the second carrier; and
send indication information to the terminal, wherein the indication information indicates performing uplink transmission on the first carrier and the second carrier in the time division multiplexing mode.

16. The apparatus according to claim 15, wherein a message carrying the first capability information further carries second capability information, wherein the second capability information indicates quantity of MIMO layers supported on the first carrier and a quantity of MIMO layers supported on the second carrier when uplink transmission is performed on the first carrier and the second carrier in simultaneous transmission mode.

17. The apparatus according to claim 15, wherein
the indication information further indicates a quantity of MIMO layers used on the first carrier and a quantity of MIMO layers used on the second carrier when uplink transmission is performed on the first carrier and the second carrier in the time division multiplexing mode, and wherein when uplink transmission is performed on the first carrier and the second carrier in the time division multiplexing mode, the quantity of MIMO layers used on the first carrier is less than or equal to the quantity of MIMO layers supported on the first carrier, and the quantity of MIMO layers used on the second carrier is less than or equal to the quantity of MIMO layers supported on the second carrier.

18. The apparatus according to claim 15, wherein the instructions that, when executed by the at least one processor, further cause the network device to:
schedule data on the first carrier and the second carrier based on the inter-carrier switching period information for uplink transmission in the time division multiplexing mode.

19. The apparatus according to claim 15, wherein the first carrier and the second carrier are carriers between the terminal and the network device.

20. The apparatus according to claim 19, wherein the first carrier and the second carrier are carriers in a carrier aggregation (CA) scenario or dual connectivity (DC) scenario.

* * * * *

UNITED STATES PATENT AND TRADEMARK OFFICE
CERTIFICATE OF CORRECTION

PATENT NO. : 12,256,380 B2  
APPLICATION NO. : 17/535335  
DATED : March 18, 2025  
INVENTOR(S) : Zhou Xu and Liwen Zhang Page 1 of 1

It is certified that error appears in the above-identified patent and that said Letters Patent is hereby corrected as shown below:

In the Claims

In Column 56, In Line 54, In Claim 16, after "indicates" insert -- a --.

Signed and Sealed this  
Twenty-second Day of July, 2025

Coke Morgan Stewart  
*Acting Director of the United States Patent and Trademark Office*